United States Patent
Mengwasser et al.

(10) Patent No.: US 12,316,523 B2
(45) Date of Patent: May 27, 2025

(54) CELLULAR NETWORK CHAOS TESTING

(71) Applicant: DISH Wireless L.L.C., Littleton, CO (US)

(72) Inventors: Brian Mengwasser, Denver, CO (US); Robert Kierzyk, Littleton, CO (US); Said Berrahil, Denver, CO (US); Henry Yu, Castle Rock, CO (US); Ignacio Brarda, Denver, CO (US)

(73) Assignee: DISH Wireless L.L.C., Littleton, CO (US)

( * ) Notice: Subject to any disclaimer, the term of this patent is extended or adjusted under 35 U.S.C. 154(b) by 342 days.

(21) Appl. No.: 17/876,767

(22) Filed: Jul. 29, 2022

(65) Prior Publication Data
US 2023/0032461 A1 Feb. 2, 2023

Related U.S. Application Data

(60) Provisional application No. 63/233,650, filed on Aug. 16, 2021, provisional application No. 63/226,913, (Continued)

(51) Int. Cl.
*H04L 43/55* (2022.01)
*H04L 41/16* (2022.01)
*H04L 41/5074* (2022.01)
*H04W 24/06* (2009.01)
*H04W 24/10* (2009.01)

(52) U.S. Cl.
CPC ............ *H04L 43/55* (2022.05); *H04L 41/16* (2013.01); *H04L 41/5074* (2013.01); *H04W 24/06* (2013.01); *H04W 24/10* (2013.01)

(58) Field of Classification Search
None
See application file for complete search history.

(56) References Cited

U.S. PATENT DOCUMENTS

| | | |
|---|---|---|
| 9,860,774 B2 | 1/2018 | Merkel et al. |
| 10,548,033 B2 | 1/2020 | Doshi et al. |

(Continued)

FOREIGN PATENT DOCUMENTS

| | | |
|---|---|---|
| CN | 112965996 A | 6/2021 |
| CN | 114153717 A | 3/2022 |

(Continued)

OTHER PUBLICATIONS

International Search Report and Written Opinion for PCT/US2022/038750 mailed Jan. 19, 2023, all pages.

*Primary Examiner* — Saumit Shah
(74) *Attorney, Agent, or Firm* — Kilpatrick Townsend & Stockton LLP

(57) ABSTRACT

Various arrangements for cellular network chaos testing are presented herein. A cloud-based environment can be created in which multiple cellular network components are executed on a cloud-based computing platform. Defined chaos can be injected into the cloud-based environment. At least one of the cellular network components is monitored to determine how the injected chaos affects the cellular network component. Performance data of the monitored cellular network component is captured from in the cloud-based environment. In response, a hybrid cloud-based production cellular network may be modified.

18 Claims, 13 Drawing Sheets

Related U.S. Application Data filed on Jul. 29, 2021, provisional application No. 63/226,917, filed on Jul. 29, 2021.

(56) References Cited

U.S. PATENT DOCUMENTS

| | | |
|---|---|---|
| 10,805,171 B1 | 10/2020 | Bilal et al. |
| 11,372,689 B1* | 6/2022 | Allen .................... G06F 9/4887 |
| 11,782,808 B2* | 10/2023 | Anand ........... G06Q 10/063112 |
| | | 714/33 |
| 2006/0239198 A1 | 10/2006 | Mlinarsky et al. |
| 2013/0297769 A1 | 11/2013 | Chang et al. |
| 2014/0357250 A1 | 12/2014 | Nitsan et al. |
| 2016/0050572 A1 | 2/2016 | Merkel et al. |
| 2016/0105810 A1 | 4/2016 | Khurana et al. |
| 2018/0287891 A1 | 10/2018 | Shaw et al. |
| 2019/0109777 A1 | 4/2019 | Mircescu |
| 2022/0224625 A1* | 7/2022 | Anderson ........... G06F 11/3006 |
| 2022/0231904 A1* | 7/2022 | Di Martino ............. H04L 43/50 |
| 2022/0272043 A1* | 8/2022 | Mishra .................... G06N 20/00 |
| 2023/0350858 A1* | 11/2023 | Karr ........................ G06F 3/064 |

FOREIGN PATENT DOCUMENTS

| | | |
|---|---|---|
| CN | 115695255 A | 2/2023 |
| EP | 3706001 A1 | 9/2020 |
| WO | 2016/191228 A1 | 12/2016 |
| WO | 2021164261 A1 | 8/2021 |

* cited by examiner

CELLULAR NETWORK CHAOS TESTING

CROSS-REFERENCE TO RELATED APPLICATIONS

This application claims priority to U.S. Provisional Patent Application No. 63/226,913, entitled "Multi-Environment Cellular Network Chaos Testing," filed on Jul. 29, 2021, the entire disclosure of which is hereby incorporated by reference for all purposes.

This application also claims priority to U.S. Provisional Patent Application No. 63/226,917, entitled "Cellular Network Advance-Simulation Slice Management," filed on Jul. 29, 2021, the entire disclosure of which is hereby incorporated by reference for all purposes.

This application claims priority to Provisional U.S. Patent Application No. 63/233,650 filed Aug. 16, 2021 entitled "Virtualized Cellular Network Multi-Stage Test and Ticketing Environment," the entire disclosure of which is hereby incorporated by reference, for all purposes, as if fully set forth herein.

BACKGROUND

Cellular networks are highly complex. Historically, such as up to and including 4G Long Term Evolution (LTE) cellular networks, many cellular network components were implemented using specialized hardware. The advent of open radio access networks (O-RAN) and virtualization allows for the functionality of many cellular network components to be implemented as software executed on general-purpose hardware platforms. Since dozens or hundreds of different software components need to communicate and function in concert, and vary independently of the supporting hardware and infrastructure, in order for the cellular network to function, extensive testing of the cellular network is necessary.

SUMMARY

Various embodiments are described related to a method for cellular network chaos testing. In some embodiments, a method for cellular network chaos testing is described. The method may include creating a cloud-based environment comprising multiple cellular network components executed on a cloud-based computing platform. The method may include injecting defined chaos into the cloud-based environment. The method may include monitoring a cellular network component of the multiple cellular network components to determine how the injected chaos affects the cellular network component. The method may include capturing performance data of the monitored cellular network component in the cloud-based environment. The method may include altering a hybrid cloud-based production cellular network based on the captured performance data.

Embodiments of such a method may include one or more of the following features: the defined chaos may be injected on a first layer of the cloud-based environment. Monitoring may be performed of a second layer of the cloud-based environment. The second layer may be a higher layer than the first layer. The first layer and the second layer may be part of a plurality of layers of the cloud-based environment. The plurality of layers may comprise, in descending order: an application orchestration layer; a virtual machine layer; a resource orchestration layer; and a physical layer. The method may further comprise, based on the performance data of the monitored cellular network component in the cloud-based environment, creating a second instance of defined chaos into the cloud-based environment. The method may further comprise capturing performance data of the monitored cellular network component in the cloud-based environment in response to the second instance of defined chaos. Monitoring of the cellular network component may be performed on the cloud-based computing platform. The method may further comprise simulating, on the cloud-based computing platform, user equipment traffic with the multiple cellular network components. The multiple cellular network components may be 5G New Radio (NR) cellular components. The cloud-based environment may comprise at least two components of a 5G NR core cellular network.

In some embodiments, a system for cellular network chaos testing is described. The system may comprise a hybrid cellular network implemented using a plurality of physical cellular network components and a plurality of cellular network core components executed on a cloud-computing platform. The system may comprise a chaos test system implemented on the cloud-computing platform. The chaos test system may be configured to create a cloud-based environment comprising multiple cellular network components executed on a cloud-based computing platform. The system may be configured to inject defined chaos into the cloud-based environment. The system may be configured to monitor a cellular network component of the multiple cellular network components to determine how the injected chaos affects the cellular network component. The system may be configured to capture performance data of the monitored cellular network component in the cloud-based environment.

Embodiments of such a system may include one or more of the following features: the system may be configured to alter a production environment of the hybrid cellular network based on the captured performance data. The defined chaos may be injected on a first layer of the cloud-based environment. Monitoring of the cellular network component may be performed of a second layer of the cloud-based environment. The second layer may be a higher layer than the first layer. The first layer and the second layer may be part of a plurality of layers of the cloud-based environment. The plurality of layers may comprise, in descending order: an application orchestration layer; a virtual machine layer; a resource orchestration layer; and a physical layer.

In some embodiments, a non-transitory processor-readable medium for cellular network chaos testing, comprising processor-readable instructions, is described. The medium may be configured to cause one or more processors to create a cloud-based environment comprising multiple cellular network components executed on a cloud-based computing platform. The medium may be configured to cause one or more processors to inject defined chaos into the cloud-based environment. The medium may be configured to cause one or more processors to monitor a cellular network component of the multiple cellular network components to determine how the injected chaos affects the cellular network component. The medium may be configured to cause one or more processors to capture performance data of the monitored cellular network component in the cloud-based environment. The medium may be configured to cause one or more processors to alter a hybrid cloud-based production cellular network based on the captured performance data.

Embodiments of such a medium may include one or more of the following features: the defined chaos may be injected on a first layer of the cloud-based environment. Monitoring may be performed of a second layer of the cloud-based environment. The second layer may be a higher layer than the first layer. The first layer and the second layer may be part of a plurality of layers of the cloud-based environment. The processor-readable instructions may be further configured to cause the one or more processors to create a second instance of defined chaos into the cloud-based environment based on the performance data of the monitored cellular network component in the cloud-based environment. The one or more processors may capture performance data of the monitored cellular network component in the cloud-based environment in response to the second instance of defined chaos. The processor-readable instructions may be further configured to cause the one or more processors to simulate user equipment traffic with the multiple cellular network components. The multiple cellular network components may be 5G New Radio (NR) cellular components.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As detailed herein, a cellular network can be implemented in a hybrid arrangement in which some local hardware, such as base stations, are distributed over a geographic area. Such hardware can be either directly or indirectly connected to a cloud-computing platform on which other virtualized components of the cellular network are executed. Such a cellular network can be a 5G New Radio (NR) cellular network. Future generations of cellular networks may also use slicing, such as 6G and 7G cellular networks.

Testing of such a cellular network is paramount. Testing should involve more than making sure that components of the cellular network function in an ideal situation. In a real-world environment, failures of components, degradation of service, hardware outages, fiber cuts, memory leaks, dropped packets and frames, and other problems occur. In order for the cellular network to function adequately in the real-world, it must be able to continue functioning sufficiently while various problems are present.

Arrangements detailed herein are focused on introducing "chaos" to test and production environment cellular networks, such as hybrid cloud cellular networks. In some embodiments, the chaos is introduced on one or more different abstraction layers of a test environment than on which performance monitoring and testing is performed. Such an arrangement can help determine the limits of the cellular network; that is, the particular conditions that cause significant degradation of service or outright failure. Beyond applying such arrangements to only cellular networks, such arrangement detailed herein can be applied to other forms of hybrid and non-hybrid networks that are used for communication other than in a cellular context.

Further, in some arrangements detailed herein, a client, which includes potential clients, of the cellular network, can be permitted to submit particular configurations that the client desires tested. Layered upon such configurations may be some amount of chaos. Based upon previous simulations of the cellular network, simulated performance data may be provided back to the client. Alternatively, if a relevant data from a previous simulation is not available, a simulation of the cellular network can be performed in order to provide relevant data to the client.

Figure 1:
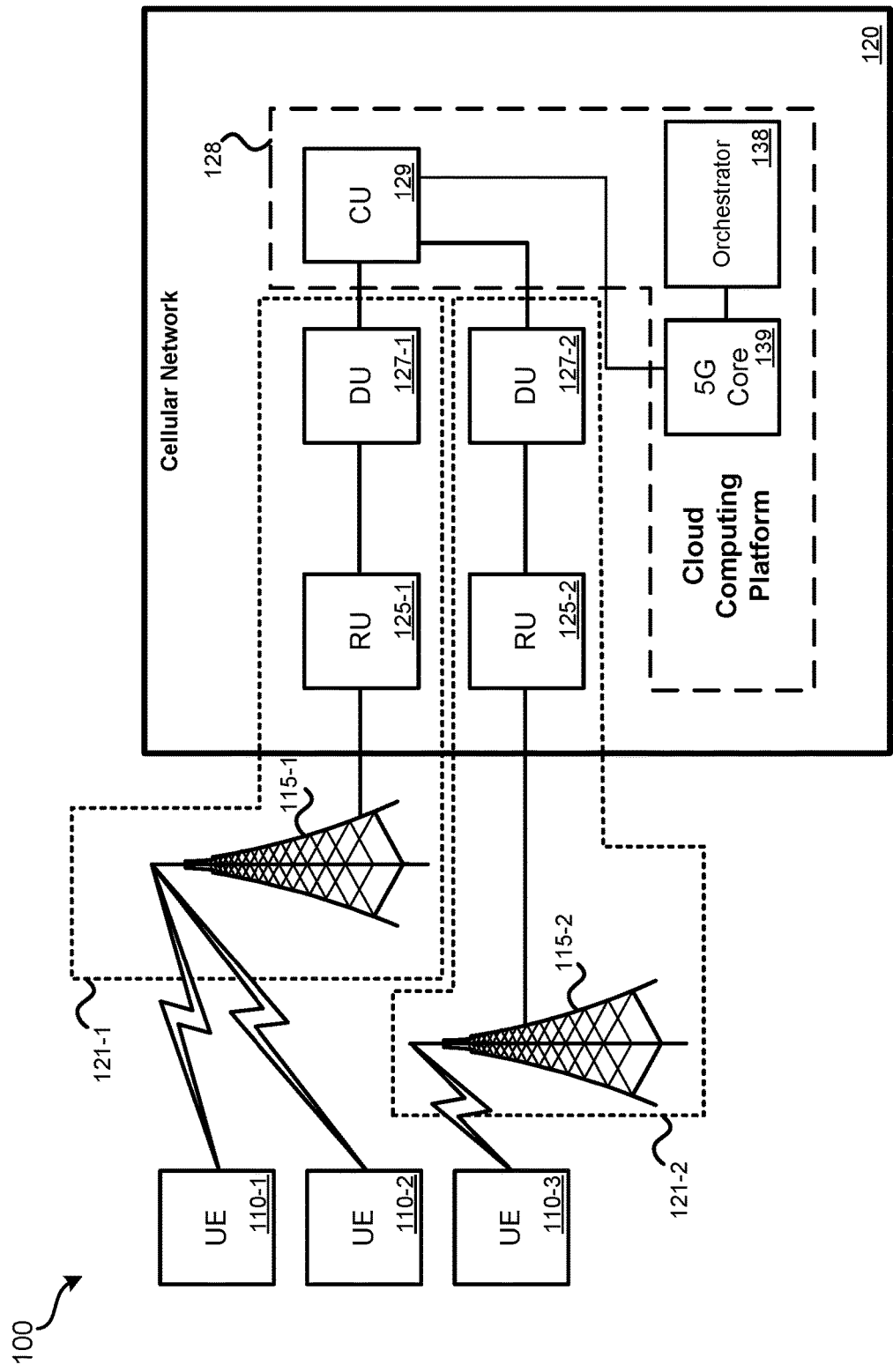
FIG. 1 illustrates an embodiment of a hybrid cloud cellular network.

Further detail regarding such arrangements is provided in relation to the figures. FIG. 1 illustrates a block diagram of a hybrid cellular network system ("system 100"). System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as RUs and local computing resources on which DUs are executed, such components may be connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools). While this instantiation of a DU may be triggered by orchestrator 138, a chaos test system, such as chaos test system 710, may introduce false DU container images in the repo, may introduce latency or memory issues in Kubernetes, may vary traffic messaging, and/or create other "chaos" in order to conduct the test. That is, chaos test system 710 is not only connected to a DU, but is connected to all the layers and systems above and below a DU, as an example.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
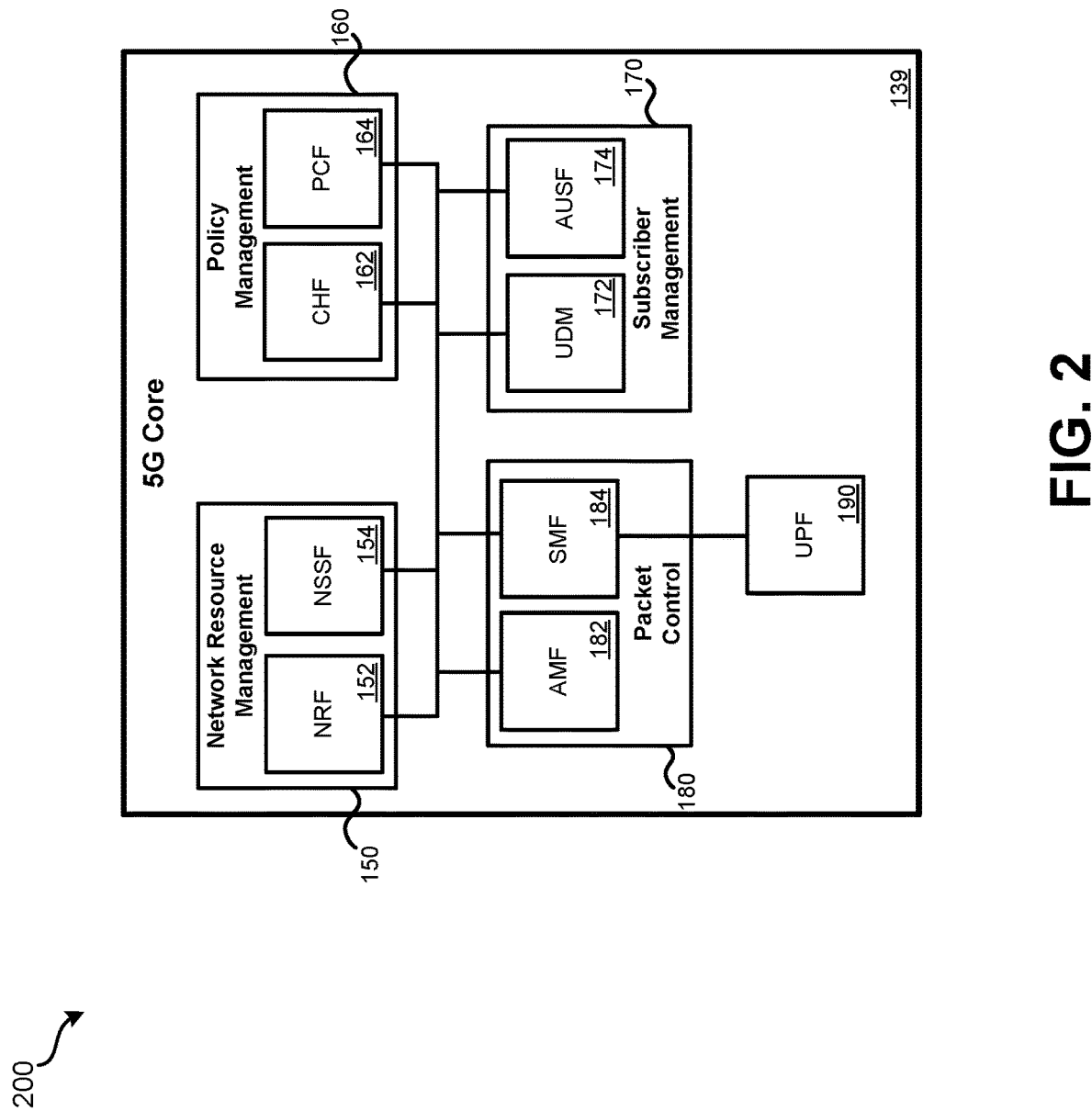
FIG. 2 illustrates an embodiment of a 5G Core.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
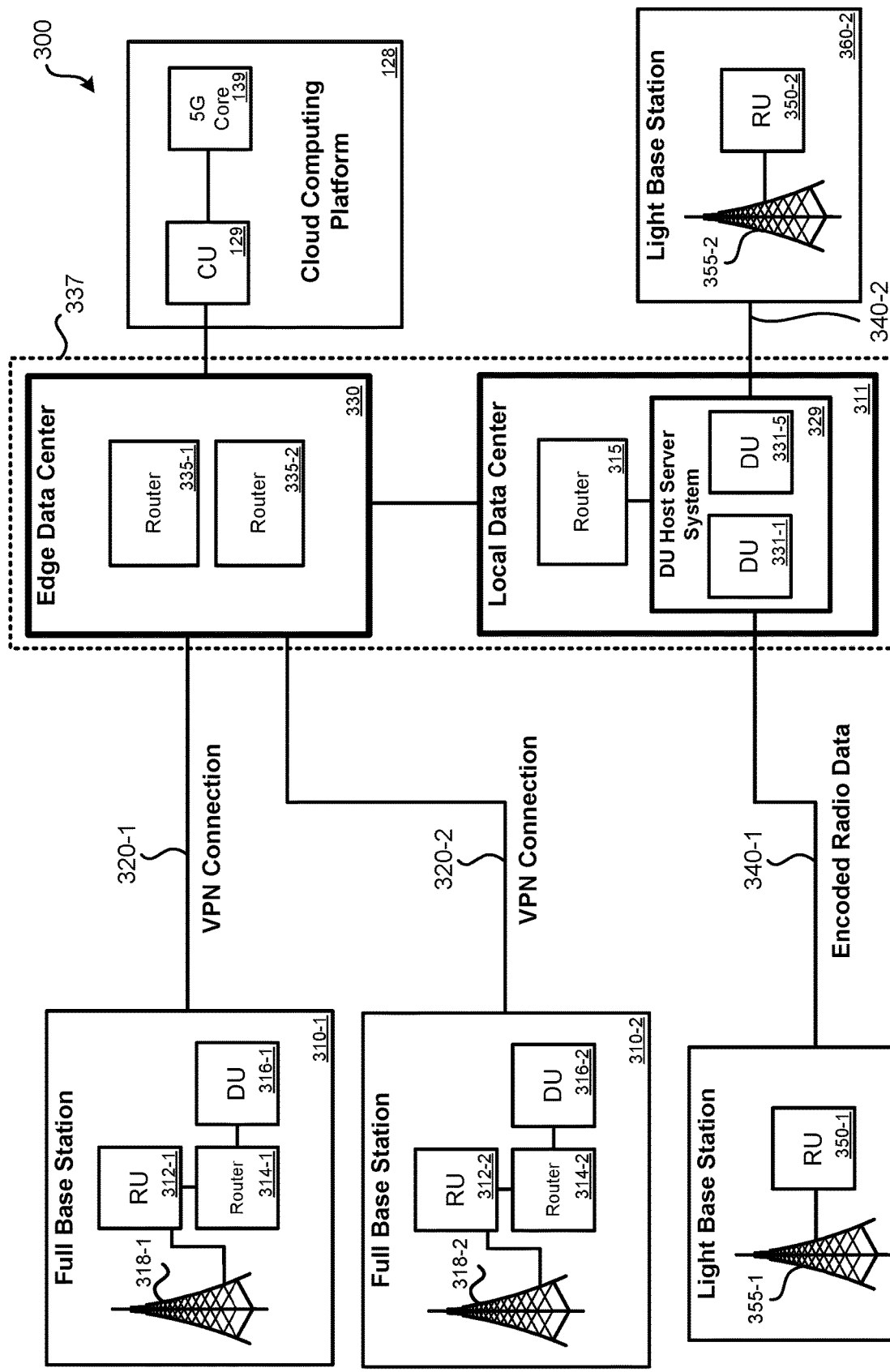
FIG. 3 illustrates an embodiment of a hybrid cloud cellular network architecture.

FIG. 3 illustrates an embodiment of hybrid cellular network system 300 ("system 300") that includes hybrid use of local and remote DUs in communication with a cloud computing platform that hosts the cellular network core. System 300 can include: LDC 311; light BSs 360; full BSs 310; VLAN connections 320; edge data center 330 ("EDC 230"); CU 129; and 5G core 139, which are executed on cloud computing platform 128. In system 300, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 310 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 310, which include on-site DUs 316, may connect with the cellular network through EDC 330. A full BS, such as full BS 310-1, can include: RU 312-1; router 314-1; DU 316-1; and structure 2318-1. Router 314-1 may have a connection to a high bandwidth communication link with EDC 330. Router 314-1 may route data between DU 316-1 and EDC 330 and between DU 316-1 and RU 312-1. In some embodiments, RU 312-1 and one or more antennas are mounted to structure 318-1, while router 314-1 and DU 316-1 are housed at a base of structure 318-1. Full BS 310-2 functions similarly to full BS 310-1. While two full BSs 310 and two light BSs 360 are illustrated in FIG. 3, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 320-1 between full BSs 310 and EDC 330 may occur over a fiber network. For example, while the connection between light BS 360-1 and LDC 370 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full BS 310-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and EDC 330, it should be understood that other protocols and non-fiber-based networks can be used for connections 320.

For communications across connection 320-1, since a fiber network that may also be used by other entities is used, a virtual local area network (VLAN) may be established between DU 316-1 and EDC 330. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Figure 4:
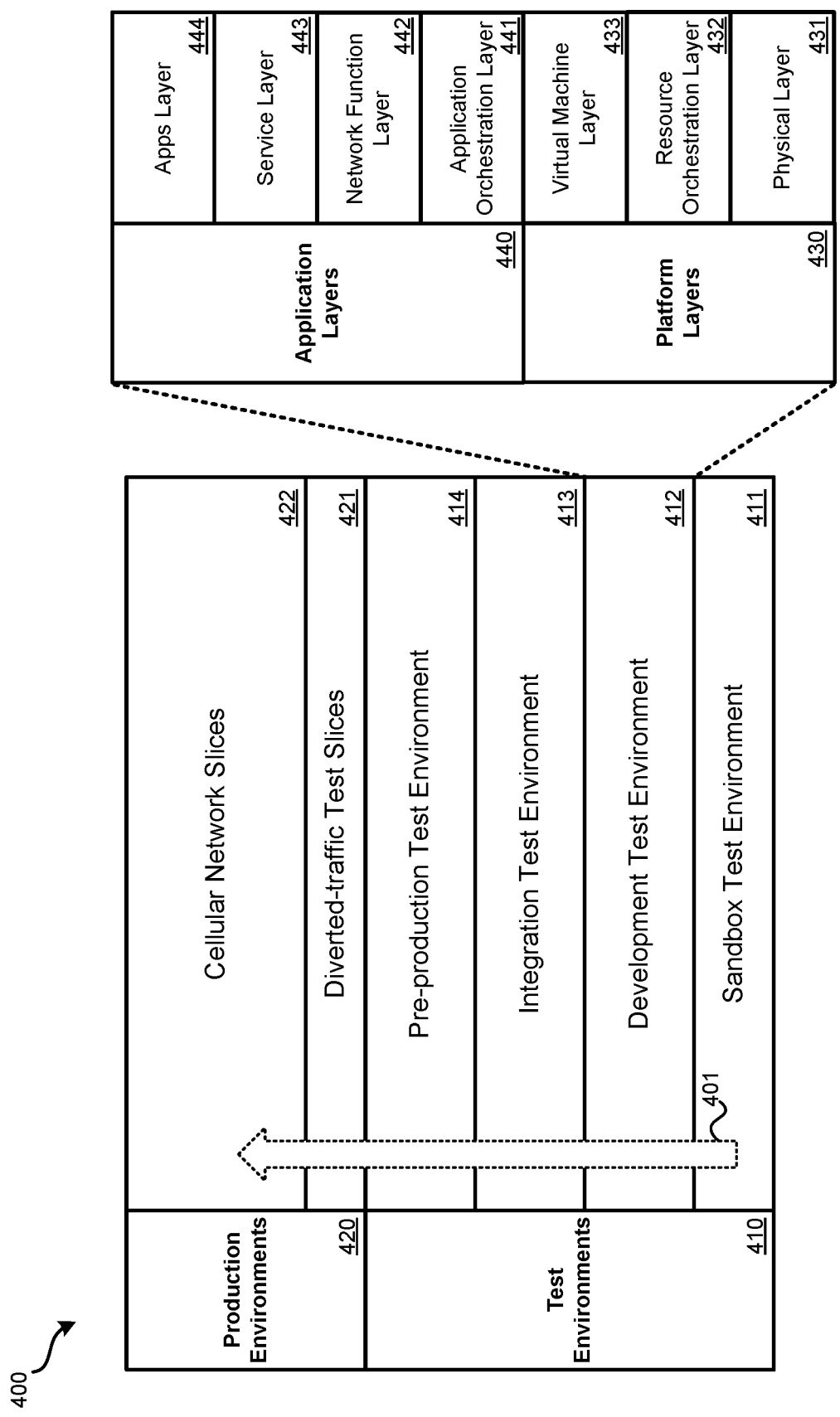
FIG. 4 illustrates an embodiment of a multi-environment cellular network test hierarchy.

FIG. 4 illustrates a cellular network test environment hierarchy 400. Chaos testing may involve testing various sub-optimal occurrences at each multiple levels of the cellular network test environment hierarchy. Two environments may be present: test environment 410 and production environment 420. Test environment 410 exists for the purpose of testing network components. Production environment 420 handles live communication traffic by clients of the cellular network provider. Typically, testing of the functionality, communication, and ability to meet specification, and handle traffic is performed starting from a lower level test environment progressing up to one or more higher levels. Not all specific test environments need to be tested; rather, the developer can test in whichever test environments they deem necessary. For example, within test environment 410, four test environment levels may be present: sandbox test environment 411 (which can also be referred to as a minimal complexity test environment); development test environment 412; integration test environment 413; and pre-production test environment 414.

Further, within each test environment 411-414, various layers may be present, which may each need to be tested, such as using, but not limited to, chaos testing. Notably, chaos can be applied to a first layer while another layer may be tested and/or monitored. This form of chaos testing can be referred to as cross-layer chaos testing. Chaos is applied on a first level while the cellular network is monitored on a different, target layer. Chaos may be applied on a lower layer than the target layer that is monitored.

Six layers of development test environment 412 are illustrated; these same layers may be present for each other layer of test environment 410. The layers can include: physical layer 431; resource orchestration layer 432; virtual machine layer 433; application orchestration layer 441; network function layer 442; service layer 443; and apps layer 444. In other embodiments, fewer or greater numbers of layers may be present within each environment. In general, layers 441-444 can be understood to be different application layers 440 and layers 431-433 can be understood as platform layers.

Physical layer 431 refers to the physical infrastructure under test. For example, this layer can include simulation of one or more servers and the capabilities of such servers and communication between such servers. To perform chaos testing on physical layer 430, servers may be simulated as going offline, coming online, frames being dropped in communication, voltage supplied to equipment being low, and equipment having a reduced processing throughput. Chaos testing at the physical level can also include simulating a fiber cut (or other form of lost communication link), a decrease in available bandwidth between servers, a broken radio (or other form of loss of available radio spectrum in a region), rain, and signal attenuation, etc.

Resource orchestration layer 432 refers to a layer at which computing resources are requisitioned and instantiated on a cloud-computing platform. From the perspective of a client, such as a cellular network operator, a cloud-computing platform operated by another entity can be understood to have an effectively limitless amount of computing resources available. When such resources are needed, such as to perform new network functions or instantiate a new instance of an existing network function, such computing resources must be reserved and configured on the cloud-computing platform. Resource orchestration layer 432 can involve using Kubernetes or some other form of resource orchestration to create and destroy resources on a cloud-computing platform. Through a resource orchestration platform, such as Kubernetes, chaos testing may be performed by rate limiting communication between components (e.g., network functions, pods of a network function) or causing frames to be dropped between components.

Virtual machine layer 433 refers to the layer at which containers of components can be deployed in an O-RAN network. Virtual machine layer 433 can involve the execution of instances of virtual machines on the cloud-computing platform, wherein virtual DUs, CUs, cloud-based applications, 5G core componentry, etc. are executed by the virtual machine. To perform chaos testing on virtual machine layer 433, errors can be introduced to IP addressing, port assignments, firewalls, memory allocation, configuration of the virtual machines. More specifically, available memory for a virtual machine may be reduced, possibly gradually over time, as form of chaos testing.

Application orchestration layer 441 represents the layer at which software components are instantiated, including network functions. The cellular network can include the execution of tens, hundreds, and even thousands of applications, some of which need to be in communication with each other. To perform chaos testing on application orchestration layer 441, simulated events can include: loading software, messaging, connectivity, software configuration, and simulated traffic volumes. As an example of a form of chaos that could be performed at application orchestration layer 441, spoofing may be performed to produce fake application-to-application messages. Testing may then be performed at a higher layer to see if the applications respond correctly, such as by recognizing them as invalid, ignoring, or otherwise filtering out the spoofed messages. Another example of chaos that could be injected is application-to-application latency. If the latency exceeds a defined value, the instance of the application may be destroyed and a new instance may be instantiated.

Network function layer 442 refers to the layer at which the confirmation, management, and coordination of processes, tasks, and services on the cellular network are performed. Orchestration can involve reconfiguring, instantiating, and rearranging components of the cellular network in order to realize particular objectives. To perform chaos testing on network function layer 442, various alarms or triggers may be triggered to see how the network reacts, various network loads may be applied to the cellular network to determine if services are properly adapted and instantiated to meet various objectives, such as the SLAs of one or more network slices. As another form of chaos, multiple instances of the same network function may be instantiated with different allocations of resources. Each of these instances can then be tested to see the amount of resources needed to effectively operate the network function.

Service layer 443 refers to the layer at which particular types of end-user services, such as voice services, messaging services, and Internet access, are coordinated and performed. Each of these services may need a particular amount of bandwidth and maximum latency, among other QoS metrics, in order to function acceptably. To perform chaos test on service layer 443, the amount of a particular service requested may be varied substantially. For instance, a greatly increased (e.g., 4×-10×) load of voice calls may be simulated on a portion of the cellular network, such as to simulate the occurrence of a natural disaster, possibly coupled with network components, such as RUs, being out of service.

At a highest level, apps layer 444 can refer to the layer at which higher-level requirements are enforced, such as a dynamic quality of service. Apps layer 444 may further be the layer at which client-specific applications are executed for a particular customer of the cellular network. For example, while for a typical point-to-point voice call, a first amount of latency is acceptable, if a multi-party conference call is occurring over different time zones, it may be possible to dynamically adjust to a different acceptable level of latency. To perform chaos testing on apps layer 444, various alarms or triggers may be triggered to see how the network reacts, various network loads may be applied to the cellular network to determine if services are properly adapted and instantiated to meet various objectives, such as the SLAs of one or more network slices.

Each of these layers may be tested as a part of each test environment 411-414, both individually and in combination. Testing may be performed in order from least complexity through the production environment, as indicated by arrow 401. In sandbox test environment 411, minimal complexity of components of the cellular network may be involved. This could, for example, involve testing how a new software component interacts with a single other software component of the cellular network. Alternatively, it could involve testing a single software component using cellular network inputs. Chaos testing can be performed on one or more of layers 431-444.

In some embodiments, one or more test environments may be made available to an external entity. For example, an external entity may be permitted access to sandbox test environment 411 in order to test the functionality of a network function developed by the external entity, the cellular network provided may provide access to a test environment such that the external entity can test the performance of the network function on the cellular network.

Development test environment 412 could involve significantly less complexity than a production environment cellular network, but greater complexity than sandbox test environment 411. For example, a group of software components that communicate with each other may be tested in development test environment 412. Chaos testing can be performed on one or more of layers 431-433 and 441-444. Integration test environment 413 would, again, include more complexity than development test environment 412 but less than a full network test environment. Again here, chaos testing can be performed on one or more of layers 431-433 and 441-444.

Pre-production test environment 414 can represent a complete replica of the cellular network being operated within test environment 410. Pre-production test environment 414 could involve simulation of both the RAT and the cloud-based components of the cellular network. In pre-production test environment 414, volumes of communication UE traffic may be simulated that are similar to the volumes of traffic experienced within production environment 420. Pre-production test environment 414 can include simulating all (or a significant percentage, such as greater than 50%) of the slices present in production environment 420. Chaos testing can be performed on one or more of layers 431-433 and 441-444 within pre-production test environment 414.

Testing may also be performed on live traffic within production environment 420. Within production environment 420, clients of the cellular network may be using the implemented cellular network for communication and therefore expect that their SLAs be met. However, in order to ensure that the cellular network is sufficiently robust to handle various failures at layers 431-433 and 441-444, chaos testing may be performed within the production environment. While testing of a particular piece of software or feature may be completed, testing is a continuous process that will likely be on-going for the life of the cellular network-software is frequently being updated and changes to the cellular network will necessitate repeated and continuous testing.

A cellular network, such as a 5G cellular network, can have slices that handle cellular network traffic for particular customers and/or particular uses according to a SLA. Within production environment 420, only a small number of slices (e.g., one, two, three, etc.) may first use the modified cellular network as part of diverted-traffic test slices 421 while the remainder of slices continue using the original production environment. Therefore, a small percentage of live cellular network traffic may first use the modified cellular network. Further, chaos testing may be performed on one or more of layers 431-433 and 441-444 of diverted-traffic test slices 421 to ensure that the modified cellular network is performing as expected in the production environment. The number of slices used as part of diverted-traffic test slices 421 may be increased during testing to put additional traffic and stress on the modified cellular network.

Once testing within diverted-traffic test slices 421 has been satisfied, cellular network slices 422, representing the remaining or all of the slices of the cellular network production environment, are processed and transmitted using the modified cellular network. Slices and environments can be dynamic and elastic in nature. They may exist for a short period of time for a specific purpose, such as to perform a test. Multiple slices may be instantiated to accelerate test scenarios in parallel.

Figure 5:
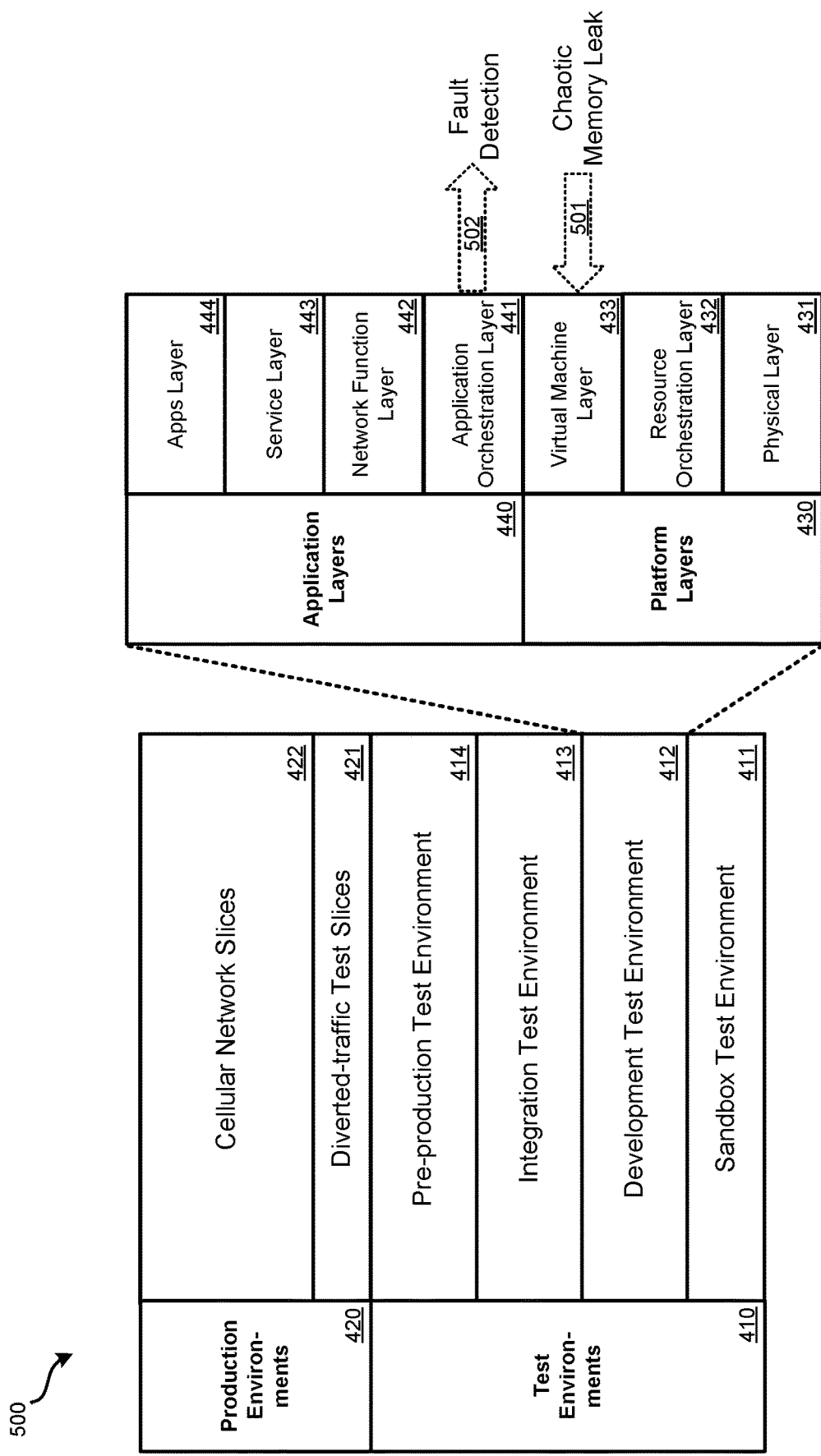
FIG. 5 illustrates an embodiment of a first example of a multi-environment cellular network test hierarchy being used to inject chaos on a first layer and perform testing on a second layer.
Figure 6:
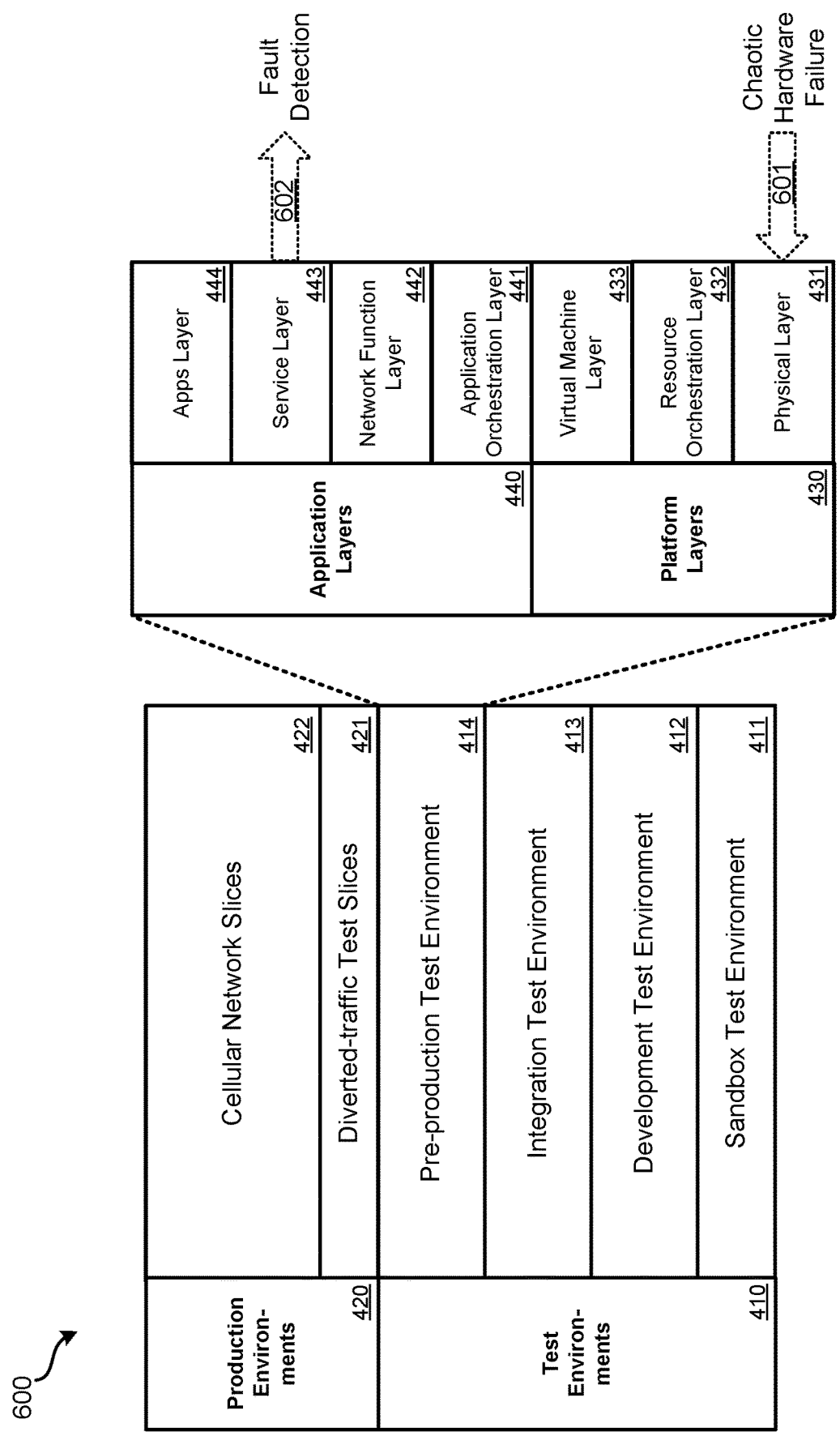
FIG. 6 illustrates an embodiment of a second example of a multi-environment cellular network test hierarchy being used to inject chaos on a first layer and perform testing on a second layer.

FIGS. 5 and 6 illustrate embodiments of cross-layer chaos testing which can be performed by injecting chaos at a lower layer while the cellular network is tested at a higher layer. While focus to these embodiments is injecting chaos at a lower layer, in other embodiments, the reverse may also be performed: chaos may be injected at a higher layer and the cellular network may be monitored at a lower layer. FIG. 5 illustrates an embodiment a multi-environment cellular network test hierarchy 500 being used to inject chaos on a first layer and perform testing on a second, higher layer.

For this test, a developer has elected to instantiate a test on the cellular network in the development test environment 412. The test involves memory leak 501 being injected at the virtual machine layer 433. Memory leak 501 can involve a fixed or increasing amount of memory allocated to a virtual machine becoming unavailable over time. This results in less memory being available for functions executed by one or more virtual machines.

Before, during, and/or after the memory leak 501 has been introduced at virtual machine layer 433, the cellular network may be monitored at the application orchestration layer 441. For example, a determination may be made as to whether fault detection 502 is performed correctly and the memory leak is detected and managed by the cellular network. The limits of the cellular network's ability to handle the memory leak can be tested. For example, the amount of memory that becomes unavailable may be gradually increased to understand at what point higher layers, such as application orchestration layer 441 has its performance begin to degrade or stops functioning altogether. Therefore, in general, a particular form of chaos may be increased over time until functionality or performance of the cellular network is impacted at a higher level.

FIG. 6 illustrates an embodiment of a multi-environment cellular network test 600 hierarchy being used to inject chaos on a first layer and perform testing on a second layer. For this test, a developer has elected to instantiate a test on the cellular network in the pre-production test environment 414. The test involves a decrease in available bandwidth acting as chaotic hardware failure 601 at physical layer 431. For example, the bandwidth decrease could occur between certain components of the RAN and the cloud-computing platform on which core components of the cellular network are executed.

Before, during, and/or after the bandwidth decrease has been introduced at physical layer 431, the cellular network may be monitored at service layer 443. For example, fault detection 602 could be performed at service layer 443. The limits of the cellular network's ability to continue functioning while bandwidth is decreased or is actively being decreased at physical layer 431 can be monitored via fault detection 502. For example, the bandwidth may continue to be decreased to understand at what point higher layers, such as at service layer 443, services provided to cellular network clients are degraded or stop functioning altogether. Therefore, in general, a particular form of chaos may be increased over time until functionality or performance of the cellular network is impacted at the higher level.

Figure 7:
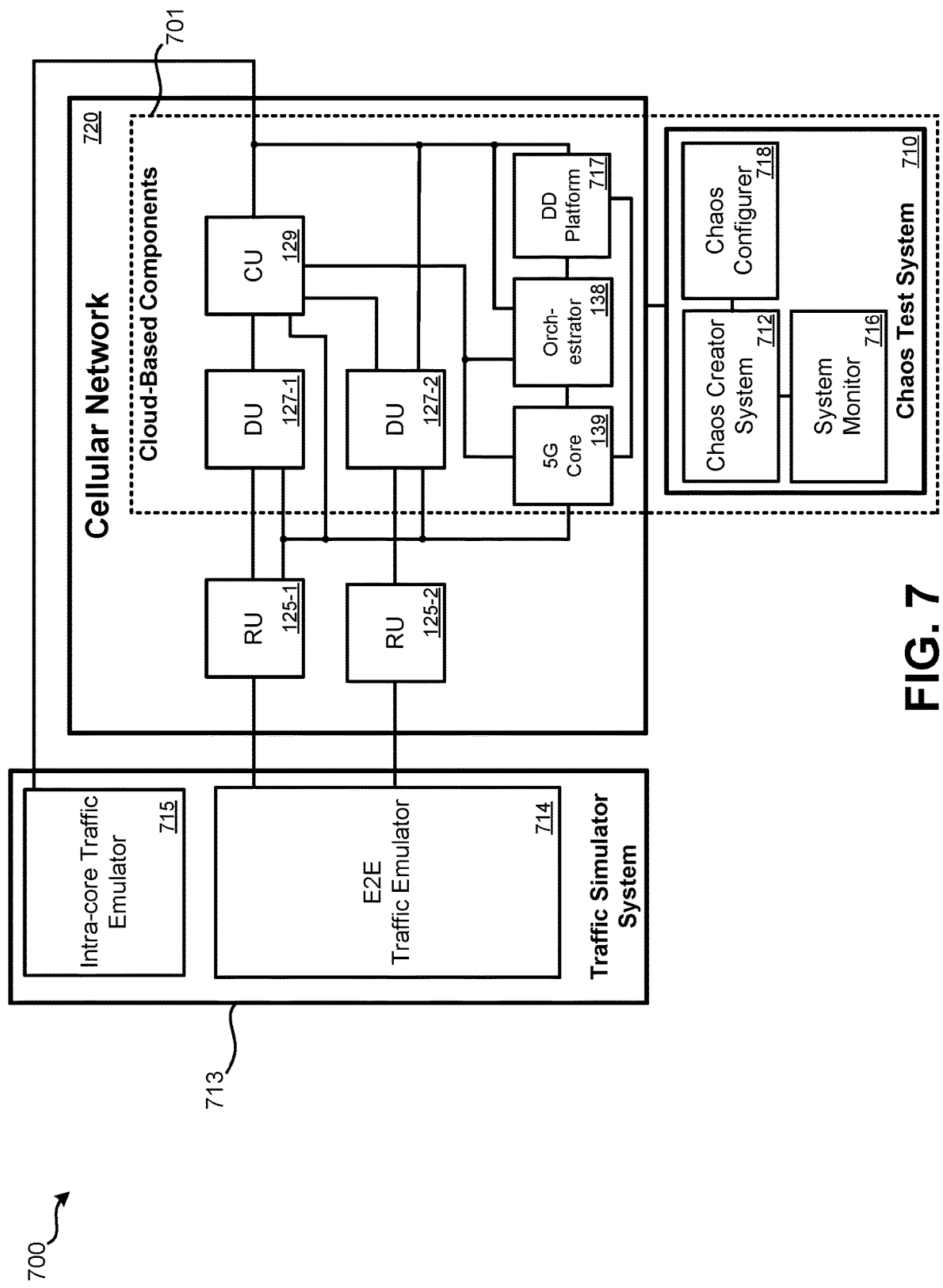
FIG. 7 illustrates an embodiment of a chaos test system integrated on a cloud-based platform for testing a hybrid cloud cellular network.

In order to introduce chaos onto a cellular network, a chaos test system can be incorporated as part of, or in communication with, a cellular network. The cellular network with which the chaos test system is incorporated or in communication with may be a hybrid cellular network that is at least partially executed on a cloud-computing platform or a cellular network that functions without use of a cloud-computing platform. FIG. 7 illustrates an embodiment 700 of a chaos test system integrated on a cloud-based platform for testing a hybrid cloud cellular network.

Embodiment 700 can include: chaos test system 710, which includes chaos creator system 712, system monitor 716, and chaos configurer 718; E2E traffic emulator 714; intra-core traffic emulator 715; distributed data platform 717 ("DD platform 717"); and cellular network 720. Cellular network 720 can represent an embodiment of the cellular network that is being simulated at varying levels of complexity, such as indicated by test environment 210. As illustrated, cellular network 120 is presented at network function layer 442; however, it should be understood this is for illustration purposes only, other layers are present as part of cellular network 720.

For cellular network 720, components that are not executed using exclusively general-purpose computing equipment, such as radio units, may also be simulated. Chaos creator system 712 and chaos configurer 718 may be external to cellular network 720 and in communication with various components of cellular network 720, especially 5G core 139. However, such components may be implemented using the same cloud-computing platform, such as indicated by the group of cloud-based components 701. Therefore, chaos test system 710 may reside on the same cloud-computing platform as components of cellular network 120, but may be understood to be separate from cellular network 120 itself.

Chaos creator system 712 may be software that is executed on underlying computerized hardware (e.g., on the cloud-computing platform) that is in communication with various portions of cellular network 720, which can be present in any of the environments of test environments 410 or production environments 420. Chaos creator system 712 may be able to simulate traffic, problems, and various other situations which can occur in a production environment as detailed in relation to layers 431-433 and 441-444 of FIG. 4. Specifically chaos creator system 712 may be able to simulate chaos within 5G core 139, which is where a large number of cloud-native network functions are deployed. Chaos creator system 712 may be able to communicate directly, via APIs with components of cellular network 720 in whichever test environment or production environment cellular network 720 resides and may be able to create various "breaks," such as simulating a fiber cut between components of cellular network 720.

In addition to creating "chaos" on cellular network 720, various network functions can attempt to be implemented to see how the network responds. For example a cloud-native network function (CNF) could be implemented via continuous integration and continuous deployment (CI/CD) with variable latency via Kubernetes. System monitor 716 may be used to implement such a function and monitor how cellular network 720 responds.

Various emulators may be used to simulate network traffic as part of traffic simulator system 713. Traffic simulator system 713, which can be implemented on the cloud-computing platform, can emulate various types and volumes of core and UE traffic in order to test a simulation of a cellular network. End-to-end (E2E) traffic emulator 714 may be used to simulate UE traffic on cellular network 720. E2E traffic emulator 714 may be used to inject traffic at some location other than via RUs. For example, simulated traffic may be injected to DUs to simulate traffic with RUs. E2E traffic emulator 714 may be used in a test environment (as opposed to a production environment) in which real-world communication traffic on the cellular network is not present. Additionally or alternatively, intra-core traffic emulator 715 may be used to simulate traffic occurring within 5G core 139 or between other cloud-based cellular system components. For example, in a lower-level test environment that does not simulate the RAN of the cellular network, intra-core traffic emulator 715 may be used without any traffic simulation by E2E traffic emulator 714. By injecting intra-core traffic, the communication and interoperability of network functions within 5G core 139 can be tested.

Chaos testing can be extended to the RAN: for example, noise can be injected into radio transmissions with RUs of the cellular network. This arrangement would be an example of interfacing with the application layer to test the physical layer and would require additionally interfacing with elements outside the system, such as drive test vehicles using physical layer measurement equipment and cloud-based systems that store drive test data.

While system monitor 716, chaos creator system 712, E2E traffic emulator 714, and intra-core traffic emulator 715 can be used in combination with a cellular network or components of a cellular network, such test components may also be used in combination with a production environment, such as diverted-traffic test slices 221 of FIG. 2. As such, various chaos testing and system implementations can be tested on a portion of the production environment prior to the modifications being released to the entirety of the production cellular network environment.

Chaos creator system 712 may be used to generate and test various failures, degradations, and/or traffic spikes within a production or test environment of cellular network 120. At least a portion of the failures generated by chaos creator system 712 may be random. For example, a fiber cut in a random location may be tested. However, another portion of the failures generated by chaos creator system 712 may be based upon failures that have actually occurred on cellular network 120. For example, cellular network 120 may be susceptible to a particular type of failure occurring more frequently than other types of failures; therefore, it can be more important to ensure that this form of failure is handled appropriately by the modified cellular network under test since it is more likely to occur.

An administrator may directly communicate with chaos creator system 712. For example, an administrator may define an environment in which the cellular network should be tested and may either provide specific chaos parameters of what should be simulated or may provide a framework within which the chaos can be randomized or based on feedback, as detailed below, determined by chaos configurer 718. The administrator may define one or more layers on which chaos is to be injected and one or more layers on which performance may be monitored (e.g., for faults).

Chaos configurer 718 may receive failure data from cellular network 120 and may use this data to determine the forms of network failures most likely to be seen. At least a portion of the chaotic failures generated by chaos creator system 712 may be selected by chaos configurer 718 based on the failures observed in the production environment or on a test environment. That is, chaos configurer 718 can serve to create a feedback loop from the cellular network under test and the chaos that is created on the cellular network. Chaos configurer 718 may use artificial intelligence (e.g. deep reinforcement learning—DRL) and an incentive-based or event-based methodology to configure chaos parameters. If via analysis of system results stored by distributed data platform 717, chaos configurer 718 determines a pattern via a statistical (e.g. correlation) or AI (e.g. reinforcement learning) method, it may trigger additional tests or vary parameters on a subsequent test accordingly in order to gain new information or improve resolution of information resulting from the test.

System monitor 716 may either directly monitor or permit an administrator to monitor how cellular network 720 is performing based upon the chaos injected by chaos creator system 712. System monitor 716 may interface with the various components of cellular network 120 as operating in the production or test environment under test and may gather fault/performance data. System monitor 716 may also allow the administrator to cause various network functions to be executed, such as the instantiation of a new container to perform the functions of one or more cloud-based cellular system components or within 5G core 139.

Each component of cellular network 720 can produce metrics, log such metrics, and send the metrics into distributed data platform 717. Alternatively, distributed data platform 717 can collect data from components of cellular network 720 by querying cloud-based and non-cloud-based components. Distributed data platform 717 can perform statistical and/or artificial intelligence-based analysis (e.g., via a trained machine learning model) to instruct orchestrator 138 what (and where) network functions are to be instantiated and destroyed. System monitor 716 of chaos test system 710 can access or search all the available data from distributed data platform 717 for the relevant observations to glean insight from a given chaos test. This mechanism can allow system monitor 716 and chaos configurer 718 to support the scalability of the volume of tests.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Figure 8:
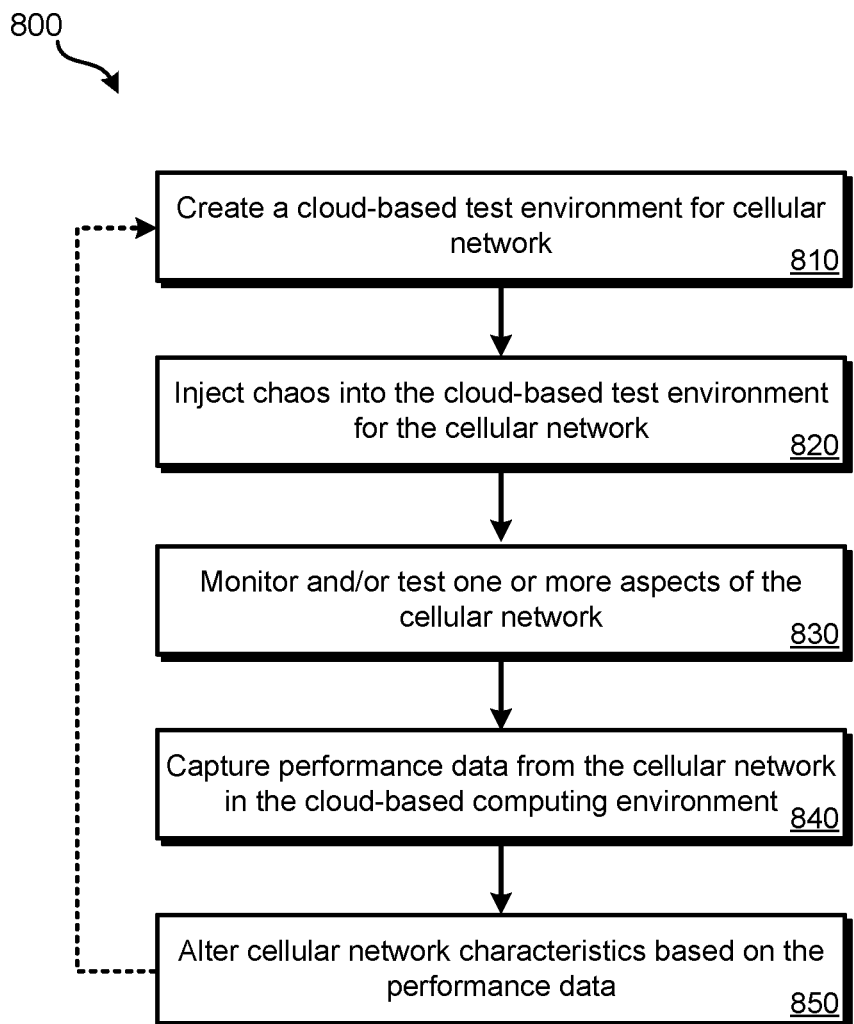
FIG. 8 illustrates an embodiment of a method for performing chaos testing on a hybrid cloud cellular network.

Various methods may be performed using the systems and architectures detailed in relation to FIGS. 1-7. FIG. 8 illustrates an embodiment of method 800 for performing chaos testing on a hybrid cloud cellular network. Method 800 may be performed to perform chaos testing on a hybrid-cloud cellular network. Method 800 may be performed using the system of FIG. 7 or some other form of system that involves a chaos test system in communication with a hybrid-cloud cellular network.

At block 810, input can be received that creates or selects a test or production environment on the cloud-computing platform. Within each test environment can include an instance of the cellular network. The cellular network instance in the test environments can have varying levels of complexity as detailed in relation to FIG. 4. Therefore, the cellular network in the test environment can range from one or two network functions to a simulation of the entire production cellular network.

At block 820, chaos can be injected by the chaos test system into the instance of the cellular network in the created or selected test environment. An administrator may define the specific chaos to be injected or may provide a defined range of layers, types, and parameters for chaos that is to be injected into the cellular network in the test environment. Within such defined rails, the chaos may be random, may be based on feedback from the instance of the cellular network, feedback from the production cellular network, or may be ramped up or down to test the cellular network.

At block 830, one or more aspects of the cellular network may be monitored and tested. To perform monitoring and testing in a test environment, intra-core traffic and/or edge-to-edge traffic may be simulated and injected onto the instance of the cellular network. At block 840, data can be extracted or captured from components of the instance of the cellular network. This data can be indicative of performance (e.g., key performance indicators), faults, statuses, etc.

At block 850, changes to one or more characteristics of a network function or another aspect of the cellular network can be made based on the captured performance data. The types of characteristics that can be changed are numerous. Examples can include: network architecture, resources allocated to network functions; load balancing; memory reservations; failover procedures; numbers of instances of network functions being allocated; settings or parameters of network functions; IP assignments; execution locations on the cloud-computing platform, etc.

In some embodiments, the changed characteristics can help decrease the effect of the injected chaos of block 820. The changes to one or more characteristics of the cellular network may be applied to the instance of the cellular network in the test environment or applied to another test or production environment. Subsequent testing may be performed by injecting similar or different chaos to a higher-level test environment or a production environment. Once an administrator has adequately tested, the changed characteristics can be implemented on the highest-level production environment.

Figure 9:
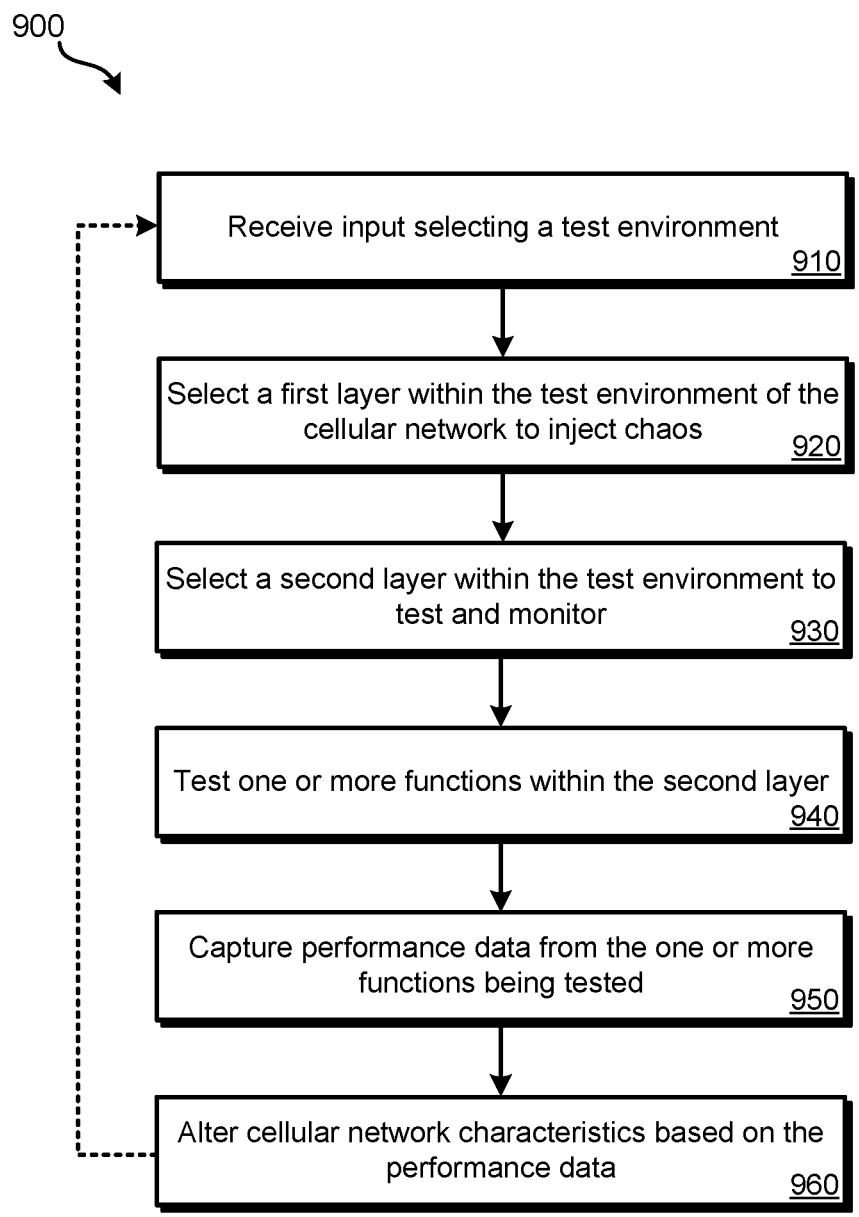
FIG. 9 illustrates an embodiment of a method for performing multi-layered chaos testing on a cellular network.

FIG. 9 illustrates an embodiment of method 900 for performing multi-layered chaos testing on a cellular network. Method 900 may be performed to perform chaos testing on a hybrid-cloud cellular network. Method 900 may be performed using the system of FIG. 7 or some other form of system that involves a chaos test system in communication with a hybrid-cloud cellular network. In other embodiments, method 900 may be performed on a cellular network that is not partially implemented on a cloud-computing platform. For example, method 900 can be applied to a traditional architecture cellular network that uses specialized hardware to perform various network functions.

At block 910, input can be received that selects a test or production environment. Within each test environment can be an instance of the cellular network. The cellular network instance in the test environments can have varying levels of complexity as detailed in relation to FIG. 4. For example, in some embodiments, test environments 410 may be available for selection or creation and production environments 420 may be available for selection (or creation).

At block 920, a first layer within the test environment can be selected on which chaos will be injected. Referring to FIG. 4, one (or more) of layers 431-433 and/or layers 441-444 may be selected. In other embodiments, the available layers may vary in names, number, and/or order.

At block 930, a second layer within the test environment can be selected on which the cellular network will be monitored. Referring to FIG. 4, one (or more) of layers 431-433 and/or layers 441-444 may be selected. In some embodiments, the second layer is a higher layer than the first layer.

At block 940, to perform monitoring and testing in the test environment, intra-core traffic and/or edge-to-edge traffic may be simulated and injected onto the instance of the cellular network. At block 950, data can be extracted or captured from components of the instance of the cellular network. This data can be indicative of performance (e.g., key performance indicators), faults, statuses, etc.

At block 960, changes to one or more characteristics of a network function or another aspect of the cellular network can be made based on the captured performance data. The types of characteristics that can be changed are numerous. Examples can include: network architecture, resources allocated to network functions; load balancing; memory reservations; failover procedures; numbers of instances of network functions being allocated; settings or parameters of network functions; IP assignments; execution locations on the cloud-computing platform, etc.

In some embodiments, the changed characteristics can help decrease the effect of the injected chaos of block 920. The changes to one or more characteristics of the cellular network may be applied to the instance of the cellular network in the test environment or applied to another test or production environment. Subsequent testing may be performed by injecting similar or different chaos to a higher-level test environment or a production environment. Once an administrator has adequately tested, the changed characteristics can be implemented on the highest-level production environment.

Figure 10:
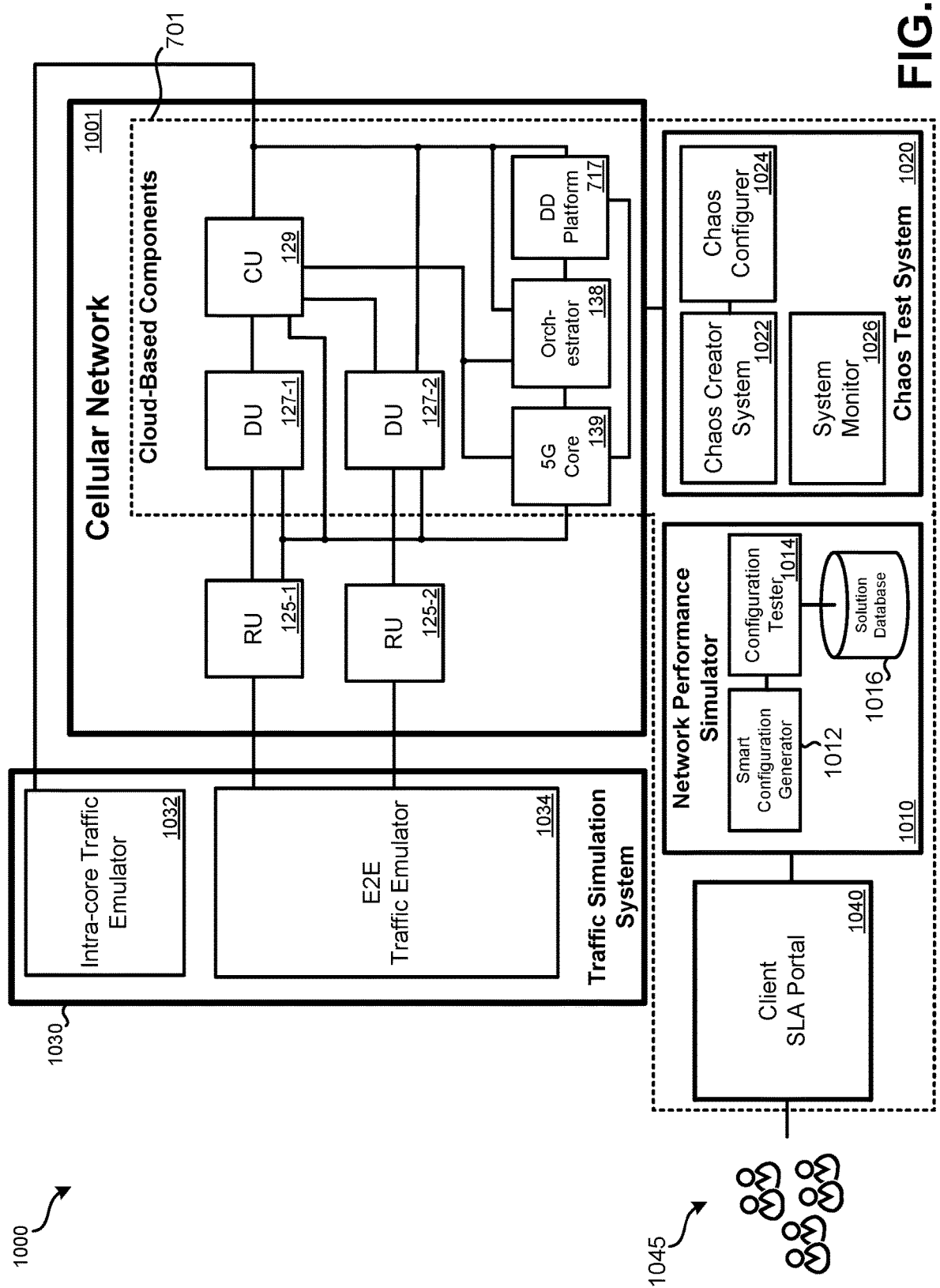
FIG. 10 illustrates a cellular network performance simulator operating in conjunction with a simulated cellular network with injected chaos.

FIG. 10 illustrates an embodiment 1000 of cellular network performance simulator operating in conjunction with a cloud-based cellular network test environment. Embodiment 1000 can include: simulated cellular network 1001; network performance simulator 1010; customer service level agreement (SLA) portal 1040; chaos test system 1020; and traffic simulation system 1030. As previously discussed, a cellular network, such as cellular network 120 of FIG. 1 can be simulated (either completely or partially). Simulated cellular network 1001 can exist in a cloud-based cellular network test environment and may be simulated to match the characteristics of cellular network 120. Simulated cellular network 1001 may match or closely match the processing, bandwidth, and architecture of cellular network 120. Specifically, simulated cellular network 1001 may be created to mirror possible cellular network 120 on some or all layers, including the physical layer; the virtual machine layer; the application layer; the orchestration layer; the service layer; and the apps layer. As an example, DU 702 of simulated cellular network may function as DU 127-1 in the simulated cellular network. Network performance simulator 1010 can work in tandem with orchestrator 703 to evaluate what orchestrator is actually capable of meeting in terms of SLAs by proactively simulating client orders and testing performance. Therefore, by applying a stressor to the simulated cellular network 1001 (e.g., chaos, traffic), an accurate determination of how cellular network 120 would perform under similar circumstances can be obtained.

Configuration tester 1014 of network performance simulator 1010 may perform complex testing of cellular network configurations, such as parameters that a client has or might request as part of an SLA, to determine how simulated cellular network 1001 may perform based on the cellular network configuration. Parameters requested by a client could, for example, include: computing and storage parameters, such as placement, dimensioning etc.; networking parameters, such as IP addressing, routing, QoS parameters, etc.; radio parameters, such as frequency bands, allocation of resources, etc.; network or client-defined software functions, such as placement, input-output data rates, networking, dynamic behaviors, etc.; slice attributes (e.g., any slice parameter); orchestration parameters, such as policies related to prioritization, life cycle management, failure management, etc.; and service and app parameters, such as types of service, configuration, data flow rates, QoS/QoE, etc.

For example, a particular set of parameters may be tested to determine what KPIs are realized by simulated cellular network 1001, how much of the resources of simulated cellular network 1001 are consumed by the parameters requested, and the ability of simulated cellular network 1001 to exceed the performance requested by the parameters. Such parameters may be tested in the form of a reserved slice, a partially-reserved slice, or as part of a general consumer slice.

Another set of parameters is the interfaces and APIs that may be present to the client's proprietary systems. For example, if the client is an ambulance company, it may set-up two slices or service combinations for general purposes and a high-performance service, such as once an ambulance picks up a patient. These slices may be simulated independently or together. The client may code logic input through client portal 1040 to determine when to switch between slices. Additionally or alternatively, the client may want an API-based adapter to connect the cellular network directly to their ambulance dispatch system. The functionality of switching services can be tested for performance as part of the simulation, as can the functionality of the API.

In addition to testing a particular set of parameters, chaos test system 1042 may be used to simulate various network loads and/or failures to determine whether the parameters can still be met while simulated cellular network 1001 is experiencing failures. The testing performed by chaos creator system 1022 may involve creation of chaos on multiple layers, either individually or simultaneously.

Chaos test system 1020 may receive failure data from the cellular network production environment (e.g., cellular network 120) and may use this data to determine the forms of cellular network failures most likely to be seen. A portion of the failures generated by chaos creator system 1022 may be selected by chaos configurer 1024 based on the failures observed in the production environment. Other failures may be randomly created chaos configurer 1024. For example, if the production cellular network has not recently experienced a fiber cut, this does not mean that a fiber cut is impossible to occur in the future—therefore, chaos configurer 1024 may randomly insert types of failures and traffic loads that have not yet or not recently been experienced by the production cellular network.

Chaos test system 1020 may be software that is executed on underlying computerized hardware that is in communication with various portions of simulated cellular network 1001. Chaos test system 1020 can be executed as part of cloud-based components 701, that is, components of the cellular network test environment and chaos test system 1020 can be executed on a cloud-computing platform. Components of chaos test system 1020, including chaos creator system 1022; chaos configurer 1024; system monitor 1026; and distributed data platform 717 can function as detailed in relation to the similarly named components of chaos test system 710 of FIG. 7.

Chaos creator system 1022 may be able to simulate traffic, problems, and various other situations which can occur in a production environment as detailed in relation to various layers, including: physical layer 431; resource orchestration layer 432; virtual machine layer 433; application orchestration layer 441; network function layer 442; service layer 443; and apps layer 444. In other embodiments, fewer or greater numbers of layers may be present within each environment. Each of these layers can be simulated as part of simulated cellular network 1001.

Specifically chaos creator system 1022 may be able to simulate chaos within 5G core 704, which is a simulation of 5G core 139, which is where a large number of cloud-native network functions are deployed. Chaos creator system 1022 may be able to communicate directly, via APIs with components of simulated cellular network 1001 and may be able to create various "issues" such as simulating a fiber cut between components of simulated cellular network 1001.

In addition to creating "chaos" on simulated cellular network 1001, various network functions can attempt to be implemented to see how the network responds. For example a cloud-native network function (CNF) could be implemented via continuous integration and continuous deployment (CI/CD) with variable latency via Kubernetes.

Traffic simulation system 1030 may be used to emulate network traffic. Traffic simulation system 1030 may be able to emulate different types and volumes of traffic. Traffic simulation system 1030 may be part of cloud-based components 701 in some embodiments; therefore, it may be executed on the same cloud-computing platform as portions of the hybrid cellular network, network performance simulator 1010, and chaos test system 1020. Alternatively, traffic simulation system 1030 can reside on a separate system. The traffic emulated may be based on data obtained from chaos test system 1020 and network performance simulator 1010. End-to-end (E2E) traffic emulator 1034 may be used to emulate UE traffic on cellular network 1001. E2E traffic emulator 1034 can emulate hundreds or thousands of calls, emergency alerts, SMS messages, MMS messages, and Internet traffic on cellular network 1001. Additionally or alternatively, intra-core traffic emulator 1032 may be used to inject traffic to network functions within 5G core 704 or between other cloud-based cellular system components. For example, intra-core traffic emulator 1034 may be used in a lower level environment in which UE traffic is not being simulated.

Chaos creator system 1020 may be used to generate and test various failures, degradations, and/or traffic spikes within simulated cellular network 1001. At least a portion of the failures generated by chaos creator system 1020 may be random. For example, a fiber cut in a random location may be tested. However, another portion of the failures generated by chaos creator system 1020 may be based upon failures that have actually occurred on production cellular network 120. For example, cellular network 120 may be susceptible to a particular type of failure occurring more frequently than other types of failures; therefore, it can be more important to ensure that this form of failure is handled appropriately by the modified cellular network under test since it is more likely to occur.

Based upon the results of simulating how the parameters affect simulated cellular network 201, result data may be stored to solution database 216. Many ranges of parameters resulting in different results may be simulated, along with various chaotic network occurrences caused by chaos creator system 242 to obtain a large set of possible solutions in solution database. A goal is to perform a significant number of simulations so that results in solution database 218 can be interpolated to accurately represent how simulated cellular network 201 will perform based on an actual set of parameters requested by potential clients 229.

Notably, performing complex cellular network simulations may not be possible to efficiently perform in real-time due to complexity and the amount of processing needed. Therefore, simulations can be performed in advance and results saved in solution database 1016. If the parameters used in a simulation exactly match requested parameters from a client, then the results corresponding to the parameters in solution database 1016 can be used to provide the client with accurate results of how their requested parameters (e.g., slice parameters) will perform on the production cellular network. If the parameters used in the simulation do not exactly match requested parameters from the client, interpolation or extrapolation of results corresponding to similar parameters in solution database 1016 can be used to provide the client with results.

As changes are implemented to production cellular network 120, simulated cellular network 1001 may be similarly modified and simulations performed by network performance simulator 1010 may be re-run for parameters to obtain updated solutions for storage in solution database 1016.

Solution database 1016 may be various types of datastores. Solution database 1016 can be stored using one or more non-transitory processor-readable mediums. In some embodiments, solution database 1016 is stored on the cloud-computing platform (which can be operated by a third-party separate from the cellular network operator), and thus may be stored across multiple servers in one or more data centers of the cloud-computing provider.

Similar to chaos test system 1020, network performance simulator 1010 may be implemented on the cloud computing platform that is used to simulate cellular network 1001 and/or to execute chaos test system 1020.

To determine the parameters that are used to perform simulations by configuration tester 1014 used to populate solution database 1016, smart configuration generator 1012 may analyze production cellular network 120 and the slices implemented on cellular network 120 to determine various parameters that tend to be implemented by clients. In some embodiments, ranges of parameters based on parameters that have been implemented on the production network may be simulated. For example, for a given parameter, a minimum and maximum value implemented on the production cellular network may be identified. Various values of the parameter within a range between the minimum and maximum value may be simulated and stored to solution database 1016.

An artificial intelligence (AI) based arrangement may be implemented as part of smart configuration generator 1012, possibly using machine learning (ML). A model may be trained using the parameters implemented for slices in accordance with various SLAs of clients on production cellular network 120 as inputs. Additional inputs can be the types of services the clients consume (e.g., streaming video, sensor data transfers, gaming). The ML model may determine ranges of parameters and combinations of parameters expected to be requested by current and potential clients in the future. For example, parameters can include: uplink bandwidth per UE; aggregate uplink bandwidth; downlink bandwidth per UE; aggregate downlink bandwidth; jitter; and latency.

Smart configuration generator 1012 may include a feedback loop, which can be referred to as reinforcement learning. When a client requests parameters that are similar to the parameters present in solution database 1016, positive feedback may be provided to reinforce the model. This positive feedback is indicative of smart configuration generator 1012 having accurately modeling potential parameter requests from clients. When a client requests parameters that are dissimilar (either individually or as a combination with other requested parameters) from the parameters used to create the results populated in solution database 1016, negative feedback may be provided, which can lead to adjustment of the model used to select parameters for test. This negative feedback is indicative of smart configuration generator 1012 having inaccurately modeling potential parameter requests from a client. This negative feedback can be used by smart configuration generator 1012 to better predict desired parameters and combinations of parameters for future simulations.

If a particular set of parameters for which a simulation is performed and for which results are stored in solution database 1016 is not only requested for review by a client of clients 1045, but is actually implemented as a production slice on production cellular network 120 based on a SLA between a client of clients 1045 and the cellular network provider being agreed upon, additional positive feedback may be provided to smart configuration generator 1012 used to reinforce the model for accurately identifying parameters or combinations of parameters desired by a client of clients 1045.

Client SLA portal 1040 can represent a portal interface through which clients 1045 can test and receive feedback on services that the client may potentially desire to obtain from the cellular network provider. Clients 1045 can represent current clients of cellular network 120 who desire additional or alternate services, potential clients who do not yet have an SLA in place with the cellular network provider, or some combination thereof. Clients 1045 may provide relatively high level definitions of the types of services desired. For example, a client may specify: a number of UE; a geographic region in which the UE will operate; and one or more types of applications to be performed using the UE. For instance, the UE may be used for 4K video streaming (or some other service that has high bandwidth needs but can, for example, be tolerant of latency and/or jitter) or the UE may be a UAV navigation system (or some other service that is intolerant of latency and/or jitter).

The client can provide indications of possible desired services (e.g., stream 4K video, receive sensor data from UE, gaming, UAV control, etc.) and/or parameters to client SLA portal 1040 after configuration tester 1014 has performed simulations and populated solution database 1016 with results. Based upon the possible desired services and/or information provided by a client, client SLA portal 1040 can define cellular network parameters that will provide a level of service sufficient to satisfy the service request from the client. The combination of parameters defined by client SLA portal 1040 can be used to search solution database 1016. Ideally, a set of parameters previously simulated by configuration tester 1014 may exactly or closely match the parameters searched by client SLA portal 1040. However, if no exact match is present, interpolation or extrapolation may be performed to average or otherwise combine the results from multiple simulations in solution database 1016 to estimate results for the parameters received from client SLA portal 1040. Client SLA portal 1040 can also include preconfigured templates. These templates can have been created based on expert guidance or what other, similar clients have ordered as well as visualization and projection tools to help interpret the results of the simulation. A client or potential client can select from a pre-configured template and possibly specify additional parameters, such as a geographic region and/or number of UE.

Client SLA portal 1040 may be hosted by the cloud-computing platform as part of cloud-based components 701. Alternatively, client SLA portal 1040 may be hosted using computer server systems operated directly by the cellular network provider.

Client SLA portal 1040 can also communicate with an Operation Support System (OSS) and business support system (BSS). For example, storage of the list of services and parameters which are possible to be simulated may be contained in these adjacent systems. Additionally, once a client has finalized the desired parameters for an SLA, the simulator system may provide the ability to commit the configuration directly into a database/repo of configurations which triggers client billing functions vis such other OSS/BSS systems. Further, customer-aware context can come from these systems, which may be helpful inputs to preloading relevant parameters, interpolating simulator results, and providing pricing quotes/options to implement the solution. Further, with this information, the system may provide suggested modifications to the client to achieve higher SLAs and/or reduce the potential cost of the service.

The results obtain from solution database 1016 can include indications of: whether the cellular network can satisfy the requested parameters; by how much the cellular network can exceed the requested parameters (or by how much the cellular network will fall short of the requested parameters); a cost associated with the request.

In response to reviewing the results, the client may elect to modify the requested services (e.g., such as request HD video instead of 4K video, alter geographic region, alter the number of UE for which the service is requested). The client may then submit a modified request to see how the results obtained are adjusted. The client may receive an indication of what the service will cost, such as in total and/or per UE. Network performance simulator 1010 may calculate a cost based on the amount of resources of the cellular network that are expected to be needed to be devoted to providing the requested service.

Figure 11:
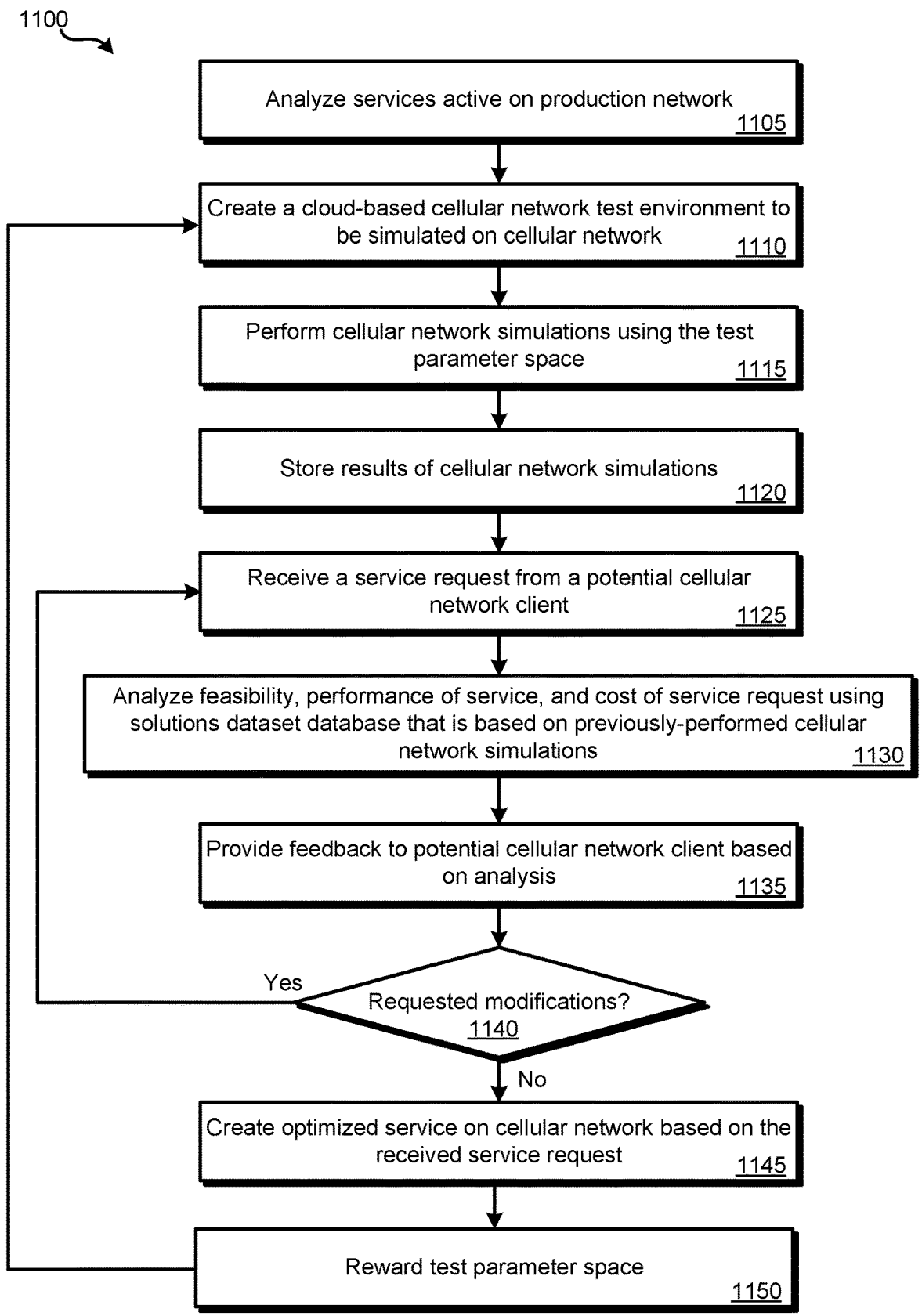
FIG. 11 illustrates a method for providing a client with real-time simulated slice operation feedback.

Various methods may be performed using the system detailed in relation to FIG. 10 or embodiments detailed in relation to earlier figures. FIG. 11 illustrates a method 1100 for providing a cellular network client with real-time simulated slice operation feedback. By storing simulation results ahead of when requested by a client, the client can be provided with results in real-time (e.g., within a second response time), thus not requiring simulation to be performed in response to the client's request.

At block 1105, services that are active on a production cellular network, such as a 5G NR cellular network, which can be a hybrid cloud implementation, may be analyzed. This analysis can involve analyzing the various NFs and slices of the production cellular network, analyzing historic cellular network traffic, bandwidth usage, and processing usage on the NFs and various slices. Further, this analysis can involve identifying instances of failures that occur on the production cellular network on various layers as detailed in relation to FIG. 4.

At block 1110, a cellular network test environment may be created, which can be cloud-based, that is to be used to perform cellular network simulations using a simulated instance of the cellular network. The test parameters applied in the cloud-based cellular network test environment can represent parameters of a service that might be requested by a current or potential client of the cellular network. For example, the presence of an additional slice having particular SLA requirements may be simulated. These test parameters can be determined based upon services and slices that have been requested and implemented on the production cellular network by other clients and based on requests which have not been implemented on the production cellular network but have been received by potential clients. In other embodiments, the test parameter space may be created blindly or based on technical specifications.

At block 1115, simulations of the cellular network may be performed using the cellular network test environment of block 1110. This can involve many simulations in the cellular network test environment being performed to determine how the production cellular network would respond if a service, NF, or slice based on the parameters was implemented on the cellular network.

The simulations of block 1115 can involve chaos being introduced by a chaos test system. Since the real world involves less-than-ideal operating conditions, chaos test system can introduce various real-world problems on varying layers as detailed in relation to FIGS. 4-6.

At block 1120, the results of the simulation for each parameter set may be stored along with an indication of the parameters used to perform the simulation. The results can be stored to a database or some other form of data store. The results may be indicative of the KPIs a client could expect to experience if such parameters were requested by the client. For example, a simulation may reveal that a particular set of parameters result in a slice, NF, or service experiencing a bottleneck and lower-than-expected performance or the simulation could reveal that a particular set of parameters results in the service functioning with a higher quality of service than expected. An analysis may be performed as to how the cellular network provider should price the service based on the simulation.

After the simulations have been performed and stood, a service request can be received from a client at block 1125. The client may submit a request that is indicative of parameters or a service the client may desire to have implemented for some number of UE on the cellular network. The client may provide either detailed parameters that the client desires or a higher-level description of the service and geographic region in which the client desires service. The client can indicate the number of UE and/or specific NFs that are desired to be available.

At block 1130, the stored results of block 1120 may be accessed and analyzed to find a parameter set match or parameters may be interpolated based on the closest matches of the parameters received as part of or determined based on the service request at block 1125. Since the simulation has previously been performed, retrieval of results corresponding to the requested service request can be performed significantly quicker (e.g., in real time) compared to if the parameters need to be simulated in the cellular network test environment after receiving the service request. Alternatively, if the parameters requested by the client are significantly different from or are outside of the ranges of parameters simulated and used to previously prepare the stored results of block 1120, the parameters may be used to define a simulation to be performed on the cellular network test environment for a future simulation. If this is the case, the client may receive feedback at a later time (e.g., several hours later, or the next day) once the simulation has been performed and results are available.

At block 1135, feedback to the client can be provided based on the results of the simulation accessed from the solution data store or database. The results can indicate KPIs and/or a cost that will be incurred by the client if they decide to implement the service defined by the service request. Other information provided as part of the feedback can be viability of the service (that is, whether the service is possible on the production cellular network, as requested), viability particulars of the service level that the client can expect to receive, such as in view of particular chaotic network occurrences (e.g., what happens if a fiber is cut at the cloud computing service provider's datacenter).

At block 1140, the client can have the opportunity to revise or modify the service request, such as to improve service or lower cost. If the client desires to modify the service request, method 1100 can return to block 1125. Otherwise, method can continue to block 1145. At block 1145, if the client desires the service and the service indicated by the service request (e.g., a defined slice) can be created on the production cellular network. Once created, UE of the client can begin to utilize the service.

At block 1150, in response to whether or not the service was created on the production cellular network, the network performance simulator that defines the cellular network test environment can receive positive or negative feedback indicative of whether the previous simulations stored the solution database properly anticipated the service request received from the client. Positive or negative feedback provided to the network performance simulator can be used to adjust future simulations to be performed.

Cellular networks are typically implemented using specialized hardware. However, with the advent of virtualization, a hybrid cellular network can be implemented that involves a mix of specialized hardware (for example, at base stations to perform radio communications) and cloud-computing resources that can execute specialized software (for example, the execution of cellular network core components on a cloud-computing platform operated by a third party. In order to understand a cellular network's capabilities, and ability to handle faults and errors, and how the cellular network is responding to new or modified components, testing should be performed continuously or almost continuously. Embodiments detailed herein are focused on automated testing of a cellular network that is in part virtualized.

Embodiments detailed herein can allow for repeated testing, with injected chaos, of components of a cellular network. Since a cloud-computing platform can have large amounts of available computing resources, a cellular network test environment can be constructed to mirror the production cellular network. In the cellular network test environment, as needed for testing, physical components (e.g., radio units and user equipment traffic) can be emulated. When testing indicates an aspect of the cellular network is not performing at or above a defined level, an electronic record or "ticket" may be created for an issue to be investigated and corrected. An analysis may be performed to determine a component of the cellular network that is likely the cause of the issue.

Access to the ticket may be granted to a third-party responsible for the component. On a cellular network that utilizes virtualization and open radio access networks (O-RAN), components may be created by many third parties. For example, a particular network function (NF) may be created and maintained by a particular third-party entity. This third-party entity may remain responsible for addressing issues and problems of the NF.

Multiple tickets that have been created may be analyzed to determine if any sort of correlation among the tickets is present. If so, an aggregated ticket may be created that shows a range of conditions under which the same issue manifests itself. Whether with regard to a single ticket, multiple tickets, or an aggregation of multiple tickets, the third-party may be provided access to a data analyzer that provides enriched information beyond what is available in the ticket itself. This information can allow the third-party to understand the configuration, loads, and environment of the cellular network that led to the issue.

In addition to creating tickets for analysis by a third-party, data from testing can be used to create a network performance map that defines how network functions perform and/or how the full network performs under various loads and tests. Such a performance map can include measurements of latency (delay to service a request), traffic (total volume of demand), errors (rate of failed requests), and saturation (level of critical resource constraint) for network components. The creation of tickets and the performance of previous tests can further be fully or partially used to define the parameters of future tests. For instance, if an issue is identified, test parameters that makes slight adjustments to the chaos introduced to the cellular network may be run as a test in order to see if the issue continues to manifest itself.

Figure 12:
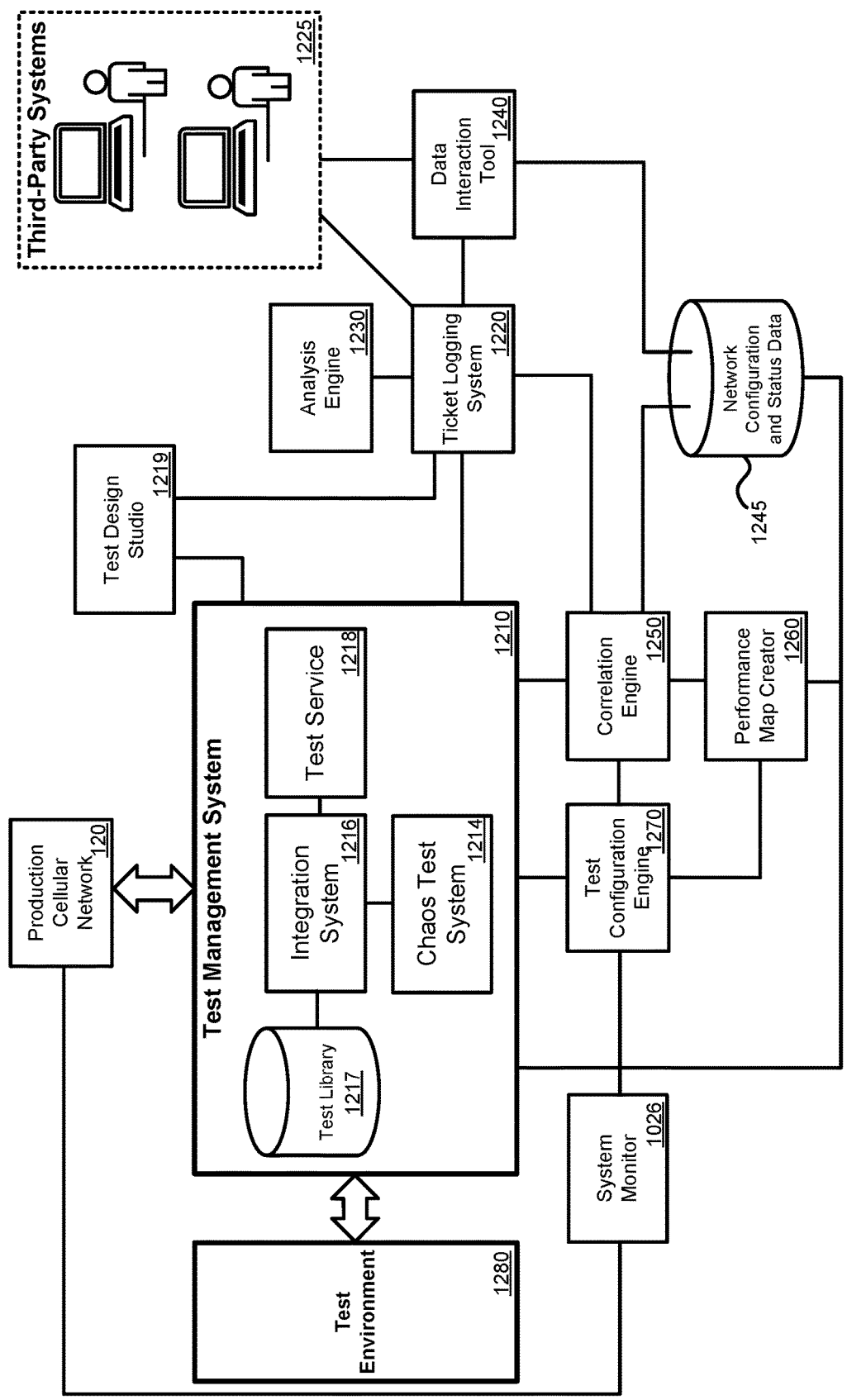
FIG. 12 illustrates a multi-stage test and ticketing system.

FIG. 12 illustrates a multi-stage test and ticketing system 1200 ("system 1200"). System 1200 can include test management system 1210; production cellular network 120; test design studio 1219; ticket logging system 1220; third party systems 1225; analysis engine 1230; data interaction tool 1240; network configuration and status database 1245; correlation engine 1250; test configuration engine 1270; and test environment 1280. The various components of system 1200 can be implemented on a cloud-computing platform. For example, the cloud-computing platform used to host at least some of the functions of production cellular network 120 can also be used to host various components of system 1200. In other embodiments, computer hardware operated directly by the cellular network operator may be used to host system 1200.

Cellular network 120, as detailed in relation to FIGS. 1 and 2, represents a production cellular network that serves UE. Cellular network 120, as previously detailed, can be a hybrid cellular network that involves specialized physical hardware (e.g., RUs, antennas) and general-purpose computing resources, both on-site at BSs and in the cloud. Various cellular network core functions can be hosted by the cloud computing platform. In other embodiments, a cellular network other than a 5G NR cellular network, which may or may not use virtualized components operating in the cloud, can be tested using test management system 1210. Test management system 1210 can communicate with the various components of 5G cellular network 120, which may be implemented using cloud-based computing resources. Since test management system 1210 can also be implemented using cloud-based computing resources, test management system 1210 and some components of 5G cellular network 120 may be implemented at a same data center or even a same server system.

At a high level, test management system 1210 creates and conducts tests on test environment 1280, which is created based on cellular network 120. The tests are used to identify problems with components of production cellular network 120 and produce a network performance map for cellular network 120. The tests performed by test management system 1210 can be created in three primary ways: defined by an administrator; based on a library of defined parameters to be tested; and/or based on feedback from previously performed tests. Tests performed by test management system 1210 can be performed while cellular network 120 is serving customers by using test environment 1280. For example, lower-level tests may be performed by instantiating all or portions of production cellular network 120 within test environment 1280 exclusively for test purposes (such as with simulated network traffic). In some embodiments, rather than using test environment 1280, while production cellular network 120 is serving customers, a portion of live cellular network traffic may be assigned to a slice on production cellular network 120 that is used for testing by test management system 1210 on live traffic. This arrangement allows for continuous or near continuous network testing with no or limited effect on the production cellular network. Test management system 1210 can include: chaos test system 1214; integration system 1216; test library 1217; and test service 1218.

Test library 1217 may define parameters of multiple tests that the cellular network operator desires to be run periodically (e.g., every day) or occasionally, either directly on production cellular network 120 or on a simulation of all or some of production cellular network 120 within test environment 1280. These tests may serve as a baseline to determine which components of cellular network 120 are not functioning properly (e.g., not meeting defined performance metrics, not functioning at all). The tests from test library 1217 can be performed in a constructed test environment on one or more layers, the test environment having been constructed based on production cellular network 120 of FIGS. 1 and 2, with the layers as defined, for example, in relation to FIG. 4. For example, in some tests, only certain 5G core components may be tested in a lower-level test environment of test environments 210; in other tests, one or more slices of production environment 220 may be tested in diverted-traffic test slices 221.

Tests performed based on test library 1271 may or may not have chaos injected. As previously detailed, such chaos is intended to replicate randomized failures that might happen on the production cellular network over time. For example, a server may crash, a fiber optic cable may be cut, traffic in a geographic region may spike, or some other occurrence may need to be handled by the cellular network. Chaos test system 1214 can function as previously detailed in relation to FIG. 7. Therefore, chaos test system 1214 can include components (which may be cloud-executed) such as chaos creator system 712, system monitor 716, and chaos configurer 718.

At least a portion of the failures generated by chaos test system 1214 may be random. For example, a fiber cut in a random location may be tested. However, another portion of the failures generated by chaos test system 1214 may be based upon failures that have actually occurred on cellular network 120. For example, production cellular network 120 may be susceptible to a particular type of failure occurring more frequently than other types of failures; therefore, it can be more important to ensure that this form of failure is handled appropriately by the modified cellular network under test since it is more likely to occur. The specific parameters for number of faults, and ranges of noise that can be created (e.g., cellular traffic spikes of up to 250%, maximum number of server or data centers to be taken offline at once) may be defined by an administrator, such as via test design studio 1219.

Chaos test system 1214 may receive failure data from production cellular network 120 and may use this data to determine the forms of network failures most likely to be seen. A portion of the failures generated by chaos test system 1214 may be based on the failures observed in the production environment. Chaos test system 1214 may use artificial intelligence (e.g. deep reinforcement learning) and/or an incentive-based or event-based methodology to configure chaos parameters. If via analysis of stored results, chaos test system 1214 determines a pattern via a statistical (e.g. correlation) or AI (e.g. reinforcement learning) method; it may trigger additional tests or vary parameters on a subsequent test accordingly in order to gain new information or improve resolution of information resulting from the test.

Integration system 1216 may formulate the test parameters based on: the layer of the cellular network to be tested (as detailed in relation to FIG. 4), the basic test parameters to be performed, and the noise to be injected as defined by chaos creator test system 1214. The parameters of the test to be performed may be passed to test service 1218, which performs the test on the appropriate layers of either test environment 1280, production cellular network 120, or a particular slice of production cellular network 120 and obtains metrics on how each cellular network component included as part of the test is performed.

Test service 1218 can have access to a database of performance metrics that are expected to be met or exceeded by the various components of cellular network 120 (or present in test environment 1280) during a test. If any of these metrics are not met or exceeded, an electronic record or "ticket" is created to document the circumstances that led to the failure of each or more than one of the metrics can be created. A ticket can include: an indication of the failure; an indication of when the failure occurred; and an error code or details associated with the error. Test management system 1210 can interface with ticket logging system 1220 to create a ticket that identifies the missed metric. In some embodiments, ticket logging system 1220 may be a commercially available ticket management system, such as Jira. Ticket logging system 1220 may be implemented as specialized processor readable instructions executed by an underlying general-purpose hardware; for example, ticket logging system 1220 may be implemented using a server system owned and operated by the cellular network provider. Alternatively, ticket logging system 1220 may be executed on the cloud-computing platform used for production cellular network 120 and test environment 1280.

Analysis engine 1230 may also be a piece of specialized software executed on general purpose hardware, that is either a server system maintained by the cellular network provider or uses cloud-based computing resources. Analysis engine 1230 may analyze the particulars of a ticket created in ticket logging system 1220 in order to determine a likely component of cellular network 120 that is the cause of the failure. Once a particular cellular network component (e.g., NF) has been identified as a likely source of failure, a third-party, such as a vendor or some other third-party, may be granted access to the ticket and notified of the ticket by either analysis engine 1234 or ticket logging system 1220.

Analysis engine 1230 may be implemented using a machine learning model or some other form of artificial intelligence. In particular, a training set of data indicative of problems previously identified on cellular network 120 that have been truth-tagged with an indication of the cellular network component that was responsible for the failure may be used as the training data to train a machine learning model, such as a neural network machine learning model, in order to perform future classifications. In situations where analysis engine 1230 performs an incorrect classification (that is, an administrator determines that a different component of cellular network 120 was responsible for a failure), the data gathered from cellular network 120 indicative of the problem and the truth tagged component responsible for the failure may be added to the training data set and the machine learning model may be retrained, thus helping to improve the accuracy of machine learning model over time.

Test design studio 1219 may be an interface through which an administrator of the cellular network provider can manually define parameters of tests. For example, test design studio 1219 may extract tickets from ticket logging system 1222 present to the administrator. Upon reviewing these tickets, an administrator may desire to manually define parameters of a test designed to probe the failure. The administrator can use test design studio 1219 to define a test environment, select one or more layers, and define the noise or chaos (or allow for random chaos) to be injected on the layer. Alternatively, a particular issue can be injected onto a selected layer having particular parameters. Such a test created using test design studio 1219 may or may not involve injection of noise by chaos test system 1214.

The results of a test that generates a ticket along with indications of the tickets themselves may be received by correlation engine 1250. Correlation engine 1250 can analyze tickets present in ticket logging system 1222 and determine whether multiple tickets have been correlated. Correlation engine 1250 may also receive data from network configuration and status database 1245, which it may use to correlate how network changes between different executions of the same test cause a failure. These correlations can be used to enrich the tickets by highlighting changes in the network that may have contributed to the condition described in the ticket.

Correlated tickets may be based on analysis engine 1230 identifying that a same component of cellular network 120 is at fault. Additionally or alternatively, correlation engine 1250 may determine that similar network conditions are present in multiple tickets that led to failure of a same or multiple components of cellular network 120. In response to determining that two or more tickets are correlated, correlation engine 1250 may combine such tickets into a single aggregated ticket or single aggregated electronic record. This arrangement can involve deleting the individual tickets such that only a single aggregated ticket needs to be reviewed and analyzed by a party responsible for the likely at-fault cellular network component. Alternatively, a new correlated ticket may be created that averages or otherwise combines network conditions that led to one or more cellular network components failing.

In addition to creating tickets, test management system 1210 can communicate with performance map creator 1260. Performance map creator 1260 may be specialized software operating on general purpose hardware, either operated directly by the cellular network provider or executed in the cloud. Performance map creator 1260 may, rather than identifying problems, maintain a map of the performance of some or all components a cross cellular network 120. By consulting the map created using performance map creator 1260, an understanding of how the cellular network can be expected to perform under particular conditions, including chaotic conditions, can be determined. The created performance map may indicate key performance indicators (KPIs) such as latency, processing load, radio spectrum usage, available bandwidth, etc. While performance map creator 1260 is shown as receiving information through correlation engine 1250, test management system 1210 may communicate directly with performance map creator 1260.

Test configuration engine 1270 can function to define parameters of tests to target particular issues identified in ticket logging system 1220 and test correlation engine 1250. Test configuration engine 1270 can also be used to define the layer on which the test is performed. For example, if a particular set of test parameters (including noise) is found to cause a performance metric to be missed by cellular network 120, test configuration engine 1270 may function to try variations of the same test, to identify what value of test parameter or parameters is causing the fault or miss. Test configuration engine 1270 may be specialized software operating on general purpose hardware, either operated directly by the cellular network provider or executed in the cloud. (In some embodiments, test configuration engine 1270 can be understood as part of test management system 1210.)

System monitor 1026 may permit monitoring of cellular network 120. System monitor 1026 may interface with the various components of cellular network 120 as operating in the production environment and may gather fault/performance data. This data can be passed to test configuration engine 1270 for use in constructing tests for use on a slice of production cellular network 120, test environment 1280, or both.

Third party systems 1225 represent computerized systems of external entities that are responsible for the performance for one or more components used as part of cellular network 120. For example, a vendor may sell or license a particular (e.g., software, hardware) component (e.g., NF) for use as part of cellular network 120 and may be responsible for updating the component as needed for performance, security, etc. As part of the sale or license, the vendor's component can be required to meet certain performance metrics. When these metrics are not met, the vendor can be required to address the issue. These issues are made available via tickets assigned to the third-party via ticket logging system 1220. In addition to directly accessing and viewing tickets in ticket logging system 1220, third party systems 1225 can have access to data interaction tool 1240. Data interaction tool 1240 can allow for much more information about the cellular network, the test, the chaos created, the layer that was tested, the layer on which chaos was injected, software component versions, and configuration data of the cellular network as present during the test to be explored by third parties using third party systems 1225. To address a ticket, a third-party may be permitted to clear a ticket (e.g., problem addressed), reassign a ticket (e.g., if the problem is not due to the party's associated component), and/or add information to the ticket. Data interaction tool 1240 may access network configuration and status database 1245, where network test data, network configuration data, chaos data, network flags, software versions, hardware versions, traffic data, and other data can be stored for investigation and review.

Figure 13:
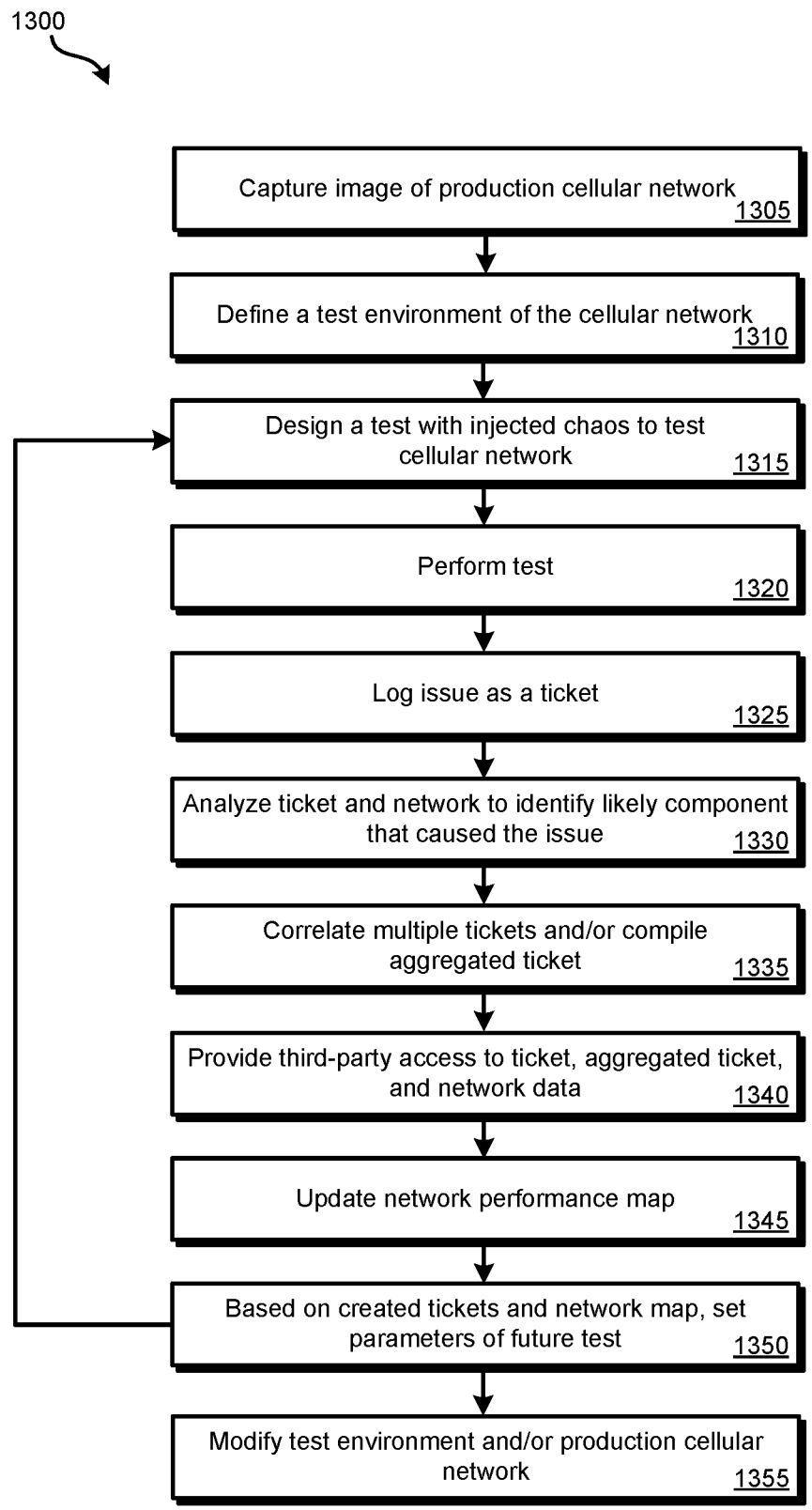
FIG. 13 illustrates an embodiment of a method for performing multi-stage testing and ticketing.

Various methods may be performed using the multi-stage test and ticketing system detailed in relation to FIG. 12, possibly in combination with embodiments detailed in relation to FIGS. 1-11. FIG. 13 illustrates an embodiment of a method 1300 for performing multi-stage testing and ticketing that can be performed using various embodiments of system 1200.

At block 1305, the production cellular network can be analyzed. This can involve identifying the NFs, slices, architecture, allocation of underlying hardware (e.g., allocated processing, storage, and memory resources per NF), bandwidth, radio resources, etc. This step can be understood as capturing an image of the production network.

At block 1310, a test environment of the production cellular network to be simulated may be defined. Based on the architecture, NFs, and components of the production cellular network captured at block 1305, a test environment is defined. The test environment, for as detailed in relation to FIG. 10, can be a simplified or full simulation of the production cellular network. In some embodiments, rather than a test environment being created as a simulation, a slice is created or selected from the production cellular network on which to perform testing.

At block 1315, a test to be run in the test environment or on the slice of the production cellular network may be designed. The test may be wholly or partially based on parameters defined in a test library, as provided by an administrator via a test design studio, as altered by a chaos creator system, and/or as targeted by a test configuration engine. In some embodiments, an initial test or tests are based on a predefined test library; then chaos is injected for later tests on various layers and in varying amounts, and as issues or faults are identified, additional tests are targeted by the test configuration engine.

At block 1320, the test may be performed. As issues are identified during the test based on the cellular network not meeting performance metrics, block 1325 is performed. At block 1325, one or more issues identified during the test are logged, each issue may at least initially be logged in a separate ticket. Such logging may be performed using a ticket logging system that stores at least basic information about the issue and provides an interface through which users and third parties can access and review the ticket.

At block 1330, the ticket can be analyzed to identify one or more components (e.g., an NF, hardware) that is likely the cause of the issue. This analysis can be performed in conjunction with the architecture used to create the test environment or is present on the test slice. Machine learning or some other arrangement may be used to analyze the ticket, the test parameters, and the cellular network parameters to determine one or more components of the cellular network that are likely a cause of the issue. Based on the one or more components identified, one or more third parties that are mapped to those particular components may be granted access to the ticket via the ticket logging system.

At block 1335, multiple tickets may be correlated and/or compiled into an aggregated ticket. Tickets that are determined to be related to the same component or components and/or tickets that involve similar test parameters may be correlated (e.g., linked) or compiled together into a single aggregated ticket within the ticket logging system.

At block 1340, third-party access can be provided to the ticket, aggregated ticket, correlated ticket, and/or network configuration data from the test. Only third-parties associated with the one or more components that are likely the cause of the issue may be given access to the ticket. Alternatively, all authorized third parties may have access to all tickets generated by test management system 1210. The third-party given access to a particular ticket may be permitted to perform various actions on the ticket, such as adding notes, clearing the ticket as completed, reassigning the ticket to another entity, etc. The third-party may be given permission to update its component on the production cellular network to rectify the issue from reoccurring.

At block 1345, a network performance map may be updated. The performance map may not indicate any particular issue logged in the ticket logging system, but rather may indicate how components of the network performed under various configurations and test parameters. The network performance map may be accessed in order to interpolate or otherwise estimate how the cellular network will perform under certain conditions.

At block 1350, based on the created tickets and the network map, one or more parameters for a future test may be defined. For example, if a particular issue with the component is identified at block 1325, a test may be defined to further explore the specific parameter, specific chaotic condition, or range of parameters that causes the issue to manifest itself. Further, such a test may be used to ensure that a fix proposed by the third-party will actually correct the issue. Method 1300 may repeat to execute this created test or some other test (e.g., based on a test library, different chaotic conditions, and/or a test created by an administrator).

At block 1350, the test environment and/or production cellular network may be modified to correct for the issue identified in the one or more electronic tickets. Such modification can involve a modified version of the component that failed (e.g., a new version of a NF) being used. For example, the updated NF may first be implemented in the test environment to determine if it functions properly and addresses the issue for which the ticket was created. If the NF is properly functional in the test environment, the NF may be implemented on the production cellular network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined.

Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for cellular network chaos testing, the method comprising:
    creating a cloud-based environment comprising multiple cellular network components executed on a cloud-based computing platform;
    injecting defined chaos into the cloud-based environment;
    monitoring a cellular network component of the multiple cellular network components to determine how the injected chaos affects the cellular network component;
    capturing performance data of the monitored cellular network component in the cloud-based environment;
    based on the performance data of the monitored cellular network component in the cloud-based environment, creating a second instance of defined chaos into the cloud-based environment;
    capturing performance data of the monitored cellular network component in the cloud-based environment in response to the second instance of defined chaos; and
    changing a characteristic of a network function of a hybrid cloud-based production cellular network based on the captured performance data.

2. The method for cellular network chaos testing of claim 1, wherein:
    the defined chaos is injected on a first layer of the cloud-based environment; and
    monitoring is performed of a second layer of the cloud-based environment.

3. The method for cellular network chaos testing of claim 2, wherein:
    the second layer is a higher layer than the first layer; and
    the first layer and the second layer are part of a plurality of layers of the cloud-based environment.

4. The method for cellular network chaos testing of claim 3, wherein the plurality of layers comprises, in descending order: an application orchestration layer; a virtual machine layer; a resource orchestration layer; and a physical layer.

5. The method for cellular network chaos testing of claim 1, wherein monitoring of the cellular network component is performed on the cloud-based computing platform.

6. The method for cellular network chaos testing of claim 1, further comprising:
    simulating, on the cloud-based computing platform, user equipment traffic with the multiple cellular network components.

7. The method for cellular network chaos testing of claim 1, wherein the multiple cellular network components are 5G New Radio (NR) cellular components.

8. The method for cellular network chaos testing of claim 1, wherein the cloud-based environment comprises at least two components of a 5G NR core cellular network.

9. A system for cellular network chaos testing, the system comprising:
    a hybrid cellular network implemented using a plurality of physical cellular network components and a plurality of cellular network core components executed on a cloud-computing platform; and
    a chaos test system implemented on the cloud-computing platform, wherein the chaos test system is configured to:
        create a cloud-based environment comprising multiple cellular network components executed on a cloud-based computing platform;
        inject defined chao into the cloud-based environment;
        monitor a cellular network component of the multiple cellular network components to determine how the injected chaos affects the cellular network component;
        create a second instance of defined chaos into the cloud-based environment based on the performance data of the monitored cellular network component in the cloud-based environment;
        capture performance data of the monitored cellular network component in the cloud-based environment in response to the second instance of defined chaos; and
    capture performance data of the monitored cellular network component in the cloud-based environment.

10. The system for cellular network chaos testing of claim 9, wherein the system is configured to alter a production environment of the hybrid cellular network based on the captured performance data.

11. The system for cellular network chaos testing of claim 9, wherein:
    the defined chaos is injected on a first layer of the cloud-based environment; and
    monitoring of the cellular network component is performed of a second layer of the cloud-based environment.

12. The system for cellular network chaos testing of claim 11, wherein the second layer is a higher layer than the first layer; and the first layer and the second layer are part of a plurality of layers of the cloud-based environment.

13. The system for cellular network chaos testing of claim 12, wherein the plurality of layers comprises, in descending order: an application orchestration layer; a virtual machine layer; a resource orchestration layer; and a physical layer.

14. A non-transitory processor-readable medium for cellular network chaos testing, comprising processor-readable instructions configured to cause one or more processors to:
create a cloud-based environment comprising multiple cellular network components executed on a cloud-based computing platform;
inject defined chaos into the cloud-based environment;
monitor a cellular network component of the multiple cellular network components to determine how the injected chaos affects the cellular network component;
capture performance data of the monitored cellular network component in the cloud-based environment;
create a second instance of defined chaos into the cloud-based environment based on the performance data of the monitored cellular network component in the cloud-based environment;
capture performance data of the monitored cellular network component in the cloud-based environment in response to the second instance of defined chaos; and changing a characteristic of a network function of a hybrid cloud-based production cellular network based on the captured performance data.

15. The non-transitory processor-readable medium for cellular network chaos testing of claim 14, wherein:
the defined chaos is injected on a first layer of the cloud-based environment; and
monitoring is performed of a second layer of the cloud-based environment.

16. The non-transitory processor-readable medium for cellular network chaos testing of claim 15, wherein:
the second layer is a higher layer than the first layer; and
the first layer and the second layer are part of a plurality of layers of the cloud-based environment.

17. The non-transitory processor-readable medium for cellular network chaos testing of claim 14, wherein the processor-readable instructions are further configured to cause the one or more processors to:
simulate user equipment traffic with the multiple cellular network components.

18. The non-transitory processor-readable medium for cellular network chaos testing of claim 14, wherein the multiple cellular network components are 5G New Radio (NR) cellular components.

* * * * *